United States Patent
Yasumoto et al.

(10) Patent No.: US 7,220,514 B2
(45) Date of Patent: May 22, 2007

(54) POLYMER ELECTROLYTE FUEL CELL

(75) Inventors: Eiichi Yasumoto, Kyoto (JP); Akihiko Yoshida, Hirakata (JP); Makoto Uchida, Hirakata (JP); Hisaaki Gyoten, Shijonawate (JP); Kazuhito Hatoh, Osaka (JP); Yasushi Sugawara, Higashiosaka (JP); Junji Morita, Moriguchi (JP); Teruhisa Kanbara, Toyonaka (JP); Yasuo Takebe, Uji (JP); Masato Hosaka, Osaka (JP); Junji Niikura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 480 days.

(21) Appl. No.: 10/335,958

(22) Filed: Jan. 3, 2003

(65) Prior Publication Data

US 2004/0131919 A1 Jul. 8, 2004

(30) Foreign Application Priority Data

| Jul. 3, 2000 | (JP) | ............................. 2000-200656 |
| Jul. 6, 2000 | (JP) | ............................. 2000-204633 |
| Jul. 6, 2000 | (JP) | ............................. 2000-204719 |
| Jun. 29, 2001 | (WO) | ....................... PCT/JP01/05684 |

(51) Int. Cl.
  *H01M 4/96* (2006.01)
  *H01M 8/10* (2006.01)
  *H01M 4/88* (2006.01)

(52) U.S. Cl. ............................. 429/42; 429/44; 429/30; 502/101; 427/115

(58) Field of Classification Search ..................... None
  See application file for complete search history.

(56) References Cited

U.S. PATENT DOCUMENTS 4,420,544 A * 12/1983 Lawson et al. ............... 429/13

(Continued)

FOREIGN PATENT DOCUMENTS

JP 61-295387 12/1986

(Continued)

OTHER PUBLICATIONS

"New Preparation Method of a High Performance Gas Diffusion Electrode Working at 100% Utilization of Catalyst Clusters and Analysis of the Reaction Layer", Masahiro Watanabe et al., J. Electroanal. Chem., 197 (1986), pp. 195-208.

(Continued)

*Primary Examiner*—Patrick Joseph Ryan
*Assistant Examiner*—Karie O'Neill
(74) *Attorney, Agent, or Firm*—McDermott Will & Emery LLP

(57) ABSTRACT

In a polymer electrolyte fuel cell including a hydrogen ion conductive polymer electrolyte membrane; a pair of electrodes composed of catalyst layers sandwiching the hydrogen ion conductive polymer electrolyte membrane between them and gas diffusion layers in contact with the catalyst layers; a conductive separator plate having a gas flow channel for supplying a fuel gas to one of the electrodes; and a conductive separator plate having a gas flow channel for supplying an oxidant gas to the other electrode, in order to bring a hydrogen ion conductive polymer electrolyte and a catalyst metal of the catalyst layers containing the hydrogen ion conductive polymer electrolyte and conductive carbon particles carrying the catalyst metal sufficiently and uniformly into contact with each other, the polymer electrolyte is provided in pores of an agglomerate structure of the conductive carbon particles. Consequently, the reaction area inside the electrodes is increased, and higher performance is exhibited.

10 Claims, 11 Drawing Sheets

U.S. PATENT DOCUMENTS

| | | | |
|---|---|---|---|
| 5,211,984 A | 5/1993 | Wilson | 427/115 |
| 5,316,871 A * | 5/1994 | Swathirajan et al. | 429/33 |
| 5,330,860 A | 7/1994 | Grot et al. | 429/42 |
| 6,391,487 B1 * | 5/2002 | Totsuka | 429/41 |
| 6,524,736 B1 * | 2/2003 | Sompalli et al. | 429/42 |
| 6,528,200 B1 | 3/2003 | Yoshitake et al. | |
| 2003/0129477 A1 * | 7/2003 | Hitomi | 429/42 |

FOREIGN PATENT DOCUMENTS

| | | |
|---|---|---|
| JP | 61-295388 | 12/1986 |
| JP | 64-62489 | 3/1989 |
| JP | 3-101057 | 4/1991 |
| JP | 3-184266 | 8/1991 |
| JP | 3-295172 | 12/1991 |
| JP | 4-264367 | 9/1992 |
| JP | 5-36418 | 2/1993 |
| JP | 6-243874 | 9/1994 |
| JP | 6-260170 A | 9/1994 |
| JP | 7-134995 | 5/1995 |
| JP | 7-220734 | 8/1995 |
| JP | 8-88007 A | 4/1996 |
| JP | 8-88008 A | 4/1996 |
| JP | 8-203537 A | 8/1996 |
| JP | 08205537 | 8/1996 |
| JP | 8-264190 | 10/1996 |
| JP | 9-92293 | 4/1997 |
| JP | 9-167622 | 6/1997 |
| JP | 9-320611 A | 12/1997 |
| JP | 10-79257 | 3/1998 |
| JP | 10-270050 A | 10/1998 |
| JP | 11-302410 | 11/1999 |
| JP | 11-329452 | 11/1999 |
| JP | 2000-3712 | 1/2000 |
| JP | 2000-12041 | 1/2000 |
| JP | 2000-100448 | 4/2000 |
| JP | 2000-173626 | 6/2000 |
| JP | 2001-319661 | 11/2001 |

OTHER PUBLICATIONS

"Morphology and Chemical Properties of the Dow Perfluorosulfonate Ionomers", Robert B. Moore et al., Macromolecules 1989, 22, pp. 3594-3599.

Yoshikawa et al, "Grafting of Polymers With Controlled Molecular Weight Onto Carbon Black Surface" Apr. 15, 1996, pp. 317-322, vol. 28, No. 4, Polymer Journal, Society of Polymer Science, Tokyo, Japan.

4 pp European Search Report.

* cited by examiner

FIG. 4
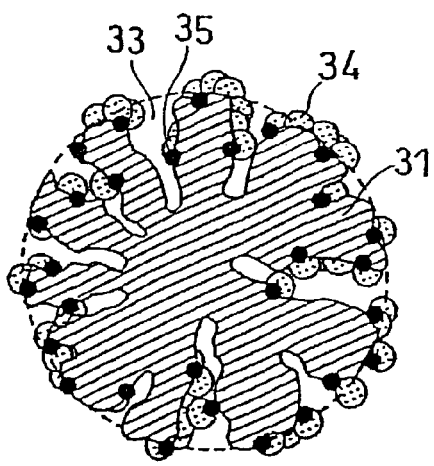
FIG. 5
(a)
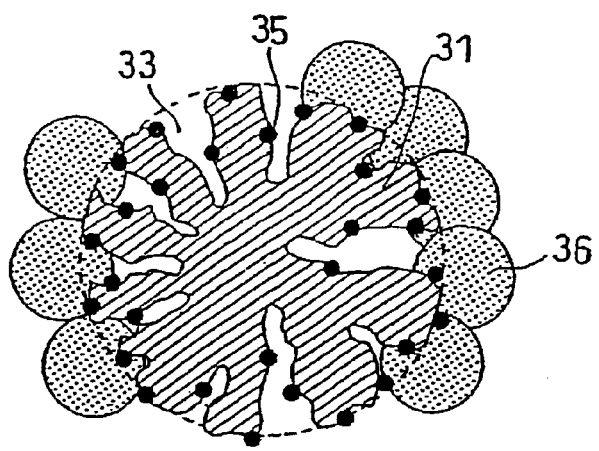
(b)
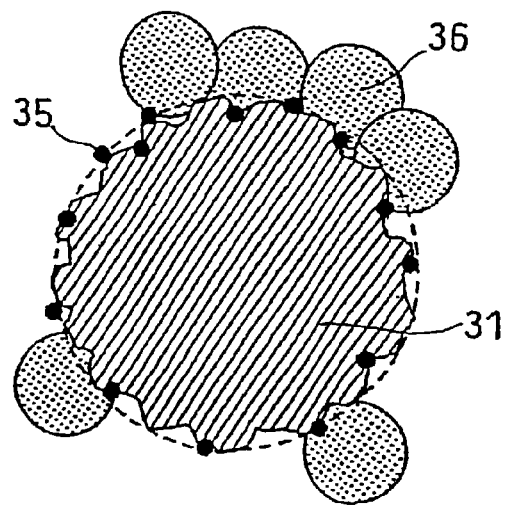

POLYMER ELECTROLYTE FUEL CELL

This application is a continuation of International Application No. PCT/JP01/05684, filed on Jun. 29, 2001, which claims the priority to Japanese Application Ser. No. 2000-200656, filed Jul. 3, 2000, Japanese Application Ser. No. 2000-204633, filed Jul. 6, 2000 and Japanese Application Ser. No. 2000-204719, filed Jul. 6, 2000.

TECHNICAL FIELD

The present invention relates to fuel cells that use pure hydrogen, reformed hydrogen obtained from methanol or fossil fuel, or liquid fuel such as methanol, ethanol and dimethyl ether directly as a fuel and use air or oxygen as an oxidant, and more particularly relates to an improvement of the catalyst layers of the electrodes of fuel cells using a polymer electrolyte.

BACKGROUND ART

A fuel cell using a polymer electrolyte generates electric power and heat simultaneously by electrochemically reacting a fuel gas containing hydrogen with an oxidant gas containing oxygen such as air. This fuel cell is basically composed of a polymer electrolyte membrane for selectively transporting hydrogen ions; and a pair of electrodes arranged on both surfaces of the polymer electrolyte membrane. The electrode is usually composed of a catalyst layer comprising a carbon powder carrying a platinum group metal catalyst, and a hydrogen ion conductive polymer electrolyte; and a gas diffusion layer having both gas permeability and electronic conductivity, which is formed on the outer surface of the catalyst layer and made of, for example, carbon paper subjected to water repellent treatment.

In order to prevent the supplied gas from leaking out and prevent the fuel gas and oxidant gas from mixing together, a gas sealing material or gaskets are arranged on the periphery of the electrodes with the polymer electrolyte membrane therebetween. The sealing material or gaskets are combined integrally with the electrodes and the polymer electrolyte membrane in advance. This is called "MEA" (electrolyte membrane and electrode assembly). Disposed outside the MEA are conductive separator plates for mechanically securing the MEA and for electrically connecting adjacent MEAs in series. The separator plates have, in the portions in contact with the MEA, a gas flow channel for supplying a reaction gas to the electrode surface and for removing a generated gas and an excess gas. Although the gas flow channels may be provided separately from the separator plates, grooves are generally formed on the surfaces of the separator plates to serve as the gas flow channels.

As a catalyst layer of a polymer electrolyte fuel cell, in general, a thin sheet formed from a mixture of a hydrogen ion conductive polymer electrolyte and a carbon fine powder carrying a platinum group metal catalyst is used. At present, as the hydrogen ion conductive polymer electrolyte, a perfluorocarbon sulfonic acid is generally used. The catalyst layer is formed by mixing a carbon fine powder carrying a catalyst such as platinum with a dispersion of a polymer electrolyte, which was prepared by dispersing a polymer electrolyte in an alcohol based solvent such as ethanol, and adding an organic solvent having a relatively high boiling point such as isopropyl alcohol and butyl alcohol to the mixture so as to form an ink; and applying the ink using a screen printing method, a spray coating method, a doctor blade method, or a roll coater method.

In the catalyst layer of the polymer electrolyte fuel cell, the size of the reaction area of a three-phase interface consisting of pores serving as reaction gas supply channels, a polymer electrolyte having hydrogen ion conductivity and an electrode material of an electron conductor is one of the most important factors that affect the discharge performance of the cell.

In order to increase the three-phase interface, conventionally, attempts were made to provide the interface between a polymer electrolyte membrane and a porous electrode with a layer in which the electrode material and the polymer electrolyte are mixed and dispersed. For instance, Japanese Examined Patent Publication Nos. Sho 62-61118 and Sho 62-61119 propose a method in which a mixture of a dispersion of a polymer electrolyte and a metal salt for a catalyst is coated on a polymer electrolyte membrane, an electrode material is hot-pressed on the coating layer, and then the metal salt is reduced; or a method in which, after reducing the metal salt in the mixture including the polymer electrolyte, the mixture is coated on the polymer electrolyte membrane, and the electrode material is hot-pressed on the coating.

Japanese Examined Patent Publication No. Hei 2-48632 proposes a method in which, after molding a porous electrode, a solution of an ion exchange resin is sprayed on the electrode, and then the electrode and ion exchange film are hot-pressed. Japanese Laid-Open Patent Publication No. Hei 3-184266 proposes a method in which a powder prepared by coating the surface of a polymer resin with a polymer electrolyte is mixed into the electrode, while Japanese Laid-Open Patent Publication No. Hei 3-295172 proposes a method in which a polymer electrolyte powder is mixed into the electrode. Japanese Laid-Open Patent Publication No. Hei 5-36418 proposes a method in which an electrode is produced by mixing a polymer electrolyte, a catalyst, a carbon powder and a fluorocarbon resin together and making the mixture to form a film.

In addition, the specification of U.S. Pat. No. 5,211,984 reports a method which comprises preparing an ink-like dispersion composed of a polymer electrolyte, a catalyst and a carbon powder using glycerin or tetrabutyl ammonium salt as a solvent, applying the dispersion on a film of polytetrafluoroethylene (hereinafter referred to as "PTFE") and then transferring it onto the surface of a polymer electrolyte membrane; or a method which comprises converting a proton exchange group of a polymer electrolyte membrane to a Na type, applying the ink-like dispersion on the surface of the membrane, and heating and drying the coat at a temperature not lower than 125° C. to convert the exchange group converted to the Na type again to the H type.

Moreover, in order to realize a high output current that is a characteristic feature of the polymer electrolyte fuel cell, it is important to increase the gas permeability/diffusing performance by forming reaction gas supply channels (gas channels) in the electrode catalyst layer. Therefore, attempts have been made to form the gas channels by adding a water repellent agent such as a fluorocarbon resin to the electrode catalyst layer. For instance, in Japanese Laid-Open Patent Publication No. Hei 5-36418, a catalyst layer is formed by dispersing and kneading a carbon powder carrying a catalyst and a PTFE powder into a dispersion of a polymer electrolyte. In Japanese Laid-Open Patent Publication No. Hei 4-264367, an electrode is formed using a mixed liquid of a carbon powder carrying a catalyst and a PTFE colloid. Further, according to J. Electroanal. Chem. No. 197 (1986), p. 195, a gas diffusion electrode for an acidic electrolyte is formed by mixing a carbon powder subjected to water repellent treatment using PTFE with a carbon powder carrying a catalyst. On the other hand, according to the specification of U.S. Pat. No. 5,211,984, the catalyst layer of the electrode is fabricated using only a polymer electrolyte, a catalyst and a carbon powder without using a water repellent agent as mentioned above.

With the above-mentioned techniques, however, since a carbon powder carrying a catalyst and a water repellent agent such as a fluorocarbon resin, or a carbon powder subjected to water repellent treatment are added simultaneously to a polymer electrolyte solution, a large amount of the polymer electrolyte adheres to the water repellent agent or the carbon powder subjected to the water repellent treatment, and accordingly the degree of contact between the polymer electrolyte and the catalyst becomes uneven, resulting in a drawback that a sufficient reaction area is not secured in the interface between the electrode and the polymer electrolyte membrane. Besides, when the electrode is fabricated using only a carbon powder carrying a catalyst and a polymer electrolyte, there is a drawback that the cell voltage at a high current density is unstable due to flooding caused by generated water.

As means for solving these drawbacks, Japanese Laid-Open Patent Publication No. Hei 8-264190 discloses a method in which a colloid of a polymer electrolyte is produced and adsorbed to a catalyst powder. However, this method has a problem that, when a conventionally used perfluorocarbon sulfonic acid ionomer having a polymerization degree of about 1000 is used as the polymer electrolyte, it is impossible to cause a noble metal catalyst present in pores smaller than colloid particles to function effectively.

Other examples of electrodes improved by focusing on the pores of the catalyst layer like the above, Japanese Laid-Open Patent Publication Nos. Hei 8-88007, Hei 9-92293, and Hei 11-329452 specify 40 to 1000 nm and 30 to 1000 nm as the optimum values of the pores of the catalyst layer. Further, as examples of electrodes improved by focusing on the pores in the primary particles of carbon particles, Japanese Laid-Open Patent Publication Nos. Hei 3-101057, Hei 9-167622, 2000-003712, and 2000-100448 specify that the threshold value for the pores in the carbon particles used for the catalyst layer is between 2.5 and 7.5 nm, not more than 8 nm, or not less than 6 nm.

Conventionally, one obtained by dispersing a generally used perfluorocarbon sulfonic acid ionomer in a solvent is generally called a polymer electrolyte solution. However, as disclosed in Macromolecules, 1989, No. 22, p.p. 3594–3599, for example, in a polymer electrolyte solution, the polymer electrolyte ionomer is just dispersed and is not dissolved in the solvent. Therefore, if the molecular weight of PTFE that is a main chain of the ionomer increases or if a polymerization degree of the ionomer increases, the particle size of the polymer electrolyte particles in the dispersion of polymer electrolyte increases.

On the other hand, when carbon particles gather, the gathered state forms an aggregate structure in which the primary particles bond together in a fused state, or an agglomerate structure in which the primary particles are simply intertwined physically and secondary. Carbon particles used generally in a fuel cell form a particulate structure called an agglomerate particle resulting from further gathering of the aggregate structures. At this time, if carbon particles with 10 to 50 nm primary particles and a large specific surface area of not less than 200 m$^2$ are used, the pores in the agglomerate structure of the carbon particles become very small. Then, when a generally used perfluorocarbon sulfonic acid ionomer with a polymerization degree of about 1000 is used as a polymer electrolyte, the polymer electrolyte cannot enter the pores in the agglomerate structure and cannot come into contact with a catalyst metal in the pores, and therefore the catalyst cannot be used effectively.

In the structure of the catalyst layer of a conventional fuel cell, a perfluorocarbon sulfonic acid ionomer with a polymerization degree of about 1000 is used as the polymer electrolyte. Hence, optimization from the above-mentioned structural view point has not been made. In other words, in order to bring the catalyst in the pores and the polymer electrolyte into contact with each other for an increase of the reaction area, the state of the polymer electrolyte also needs to be optimized, and it is insufficient to just optimize the pores of the catalyst layer or the pores of carbon particles as in the conventional examples.

DISCLOSURE OF INVENTION

In order to solve the above problems, it is an object of the present invention to provide a polymer electrolyte fuel cell capable of exhibiting higher performance by sufficiently and uniformly bringing a polymer electrolyte and a catalyst into contact with each other to increase the reaction area inside the electrodes.

The present invention provides a polymer electrolyte fuel cell comprising: a hydrogen ion conductive polymer electrolyte membrane; a pair of electrodes which have catalyst layers sandwiching the hydrogen ion conductive polymer electrolyte membrane therebetween and gas diffusion layers in contact with the catalyst layers; a conductive separator plate having a gas flow channel for supplying a fuel gas to one of the electrodes; and a conductive separator plate having a gas flow channel for supplying an oxidant gas to the other electrode, wherein the catalyst layers comprise a hydrogen ion conductive polymer electrolyte and conductive carbon particles carrying a catalyst metal, and the hydrogen ion conductive polymer electrolyte is provided in pores of an agglomerate structure of the conductive carbon particles.

The agglomerate structure of the conductive carbon particles preferably has pores which are not smaller than 5 nm and not greater than 100 nm.

Moreover, it is preferred that the hydrogen ion conductive polymer electrolyte be in the pores of primary particles of the conductive carbon particles.

The present invention provides a polymer electrolyte fuel cell comprising: a hydrogen ion conductive polymer electrolyte membrane; a pair of electrodes which comprise catalyst layers sandwiching the hydrogen ion conductive polymer electrolyte membrane therebetween and gas diffusion layers in contact with the catalyst layers; a conductive separator plate having a gas flow channel for supplying a fuel gas to one of the electrodes; and a conductive separator plate having a gas flow channel for supplying an oxidant gas to the other electrode, wherein the catalyst layers comprise a hydrogen ion conductive polymer electrolyte and conductive carbon particles carrying a catalyst metal, and the hydrogen ion conductive polymer electrolyte be in the pores of primary particles of the conductive carbon particles.

The primary particles of the conductive carbon particles preferably have pores which are not smaller than 1 nm and not greater than 10 nm.

The molecular weight of the hydrogen ion conductive polymer electrolyte used herein is not less than 10,000 and not more than 500,000.

Further, it is preferred that the polymerization degree of hydrogen ion conductive polymer electrolyte is not less than 10 and not more than 500.

BRIEF DESCRIPTION OF DRAWINGS

FIG. 4 is a concept view showing the relationship between the pore structure of primary particles of carbon particles and a polymer electrolyte in an example of the present invention.

FIG. 5 is a concept view showing the relationship between the pore structure of primary particles of carbon particles and a polymer electrolyte in a comparative example.

BEST MODE FOR CARRYING OUT THE INVENTION

Figure 1:
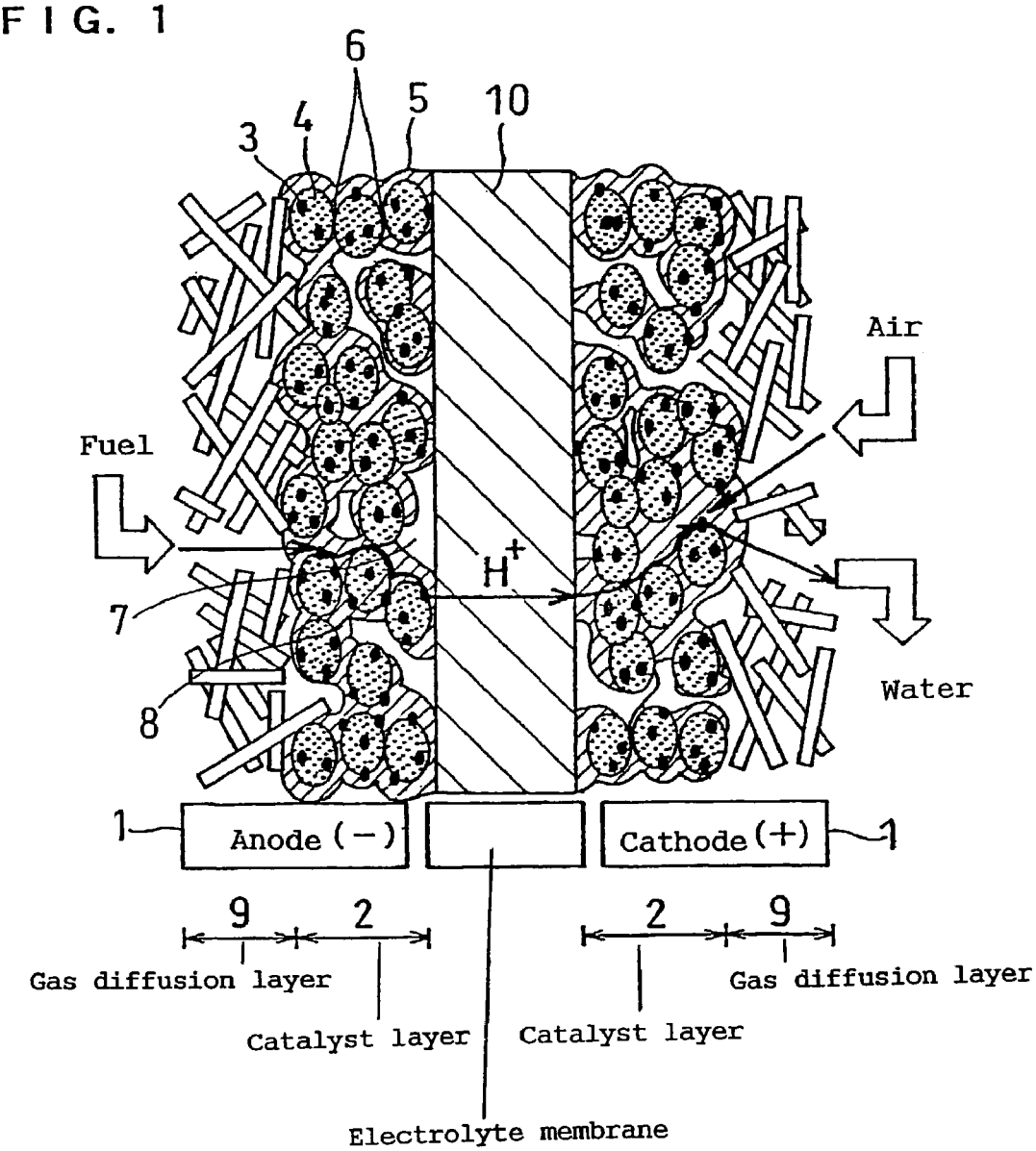
FIG. 1 is a schematic view showing a model of cross section of an electrolyte membrane-electrode assembly in a polymer electrolyte fuel cell.

A characteristic feature of the present invention is that a hydrogen ion conductive polymer electrolyte is provided in pores of an agglomerate structure of carbon particles in a catalyst layer constituting a polymer electrolyte fuel cell. In order to realize this structure, the pores of the agglomerate structure of the carbon particles are preferably not smaller than 5 nm and not greater than 100 nm.

The size of the agglomerated carbon particles is preferably 100 nm to 10 μm, and more preferably 100 nm to 1000 nm.

In another aspect of the present invention, the hydrogen ion conductive polymer electrolyte is provided in pores of primary particles of carbon particles. In order to realize this structure, the primary particle size of the carbon particles is preferably 10 to 150 nm, and the pores are preferably not smaller than 1 nm and not greater than 10 nm.

In either aspect of the present invention, the hydrogen ion conductive polymer electrolyte preferably has a molecular weight of not less than 10,000 and not more than 500,000, or a polymerization degree of not less than 10 and not more than 500.

With this structure, the polymer electrolyte and the catalyst are brought into contact with each other to cause the catalyst, which had not contributed to the reaction, to function as an active site of the reaction, and to increase the reaction area inside the electrodes.

The polymer electrolyte is a copolymer of tetrafluoroethylene containing a sulfonic acid group and fluorovinyl ether, and it is brought into contact with the catalyst particles in the pores of the agglomerate structure or the primary particles in the catalyst layer by decreasing the degree of polymerization or the molecular weight. In order to maintain physical independence, a conventionally used perfluorosulfonic acid polymer has a polymerization degree of about 1000. A polymer electrolyte with such a large degree of polymerization cannot be introduced into the pores of the agglomerate structure of the carbon particles, or the pores of the primary particles of the carbon particles.

In the present invention, since the polymer electrolyte is adsorbed to carbon fine particles in the catalyst layer, the polymer does not need to keep the shape by itself, thereby achieving a polymer with a lower molecular weight and a lower degree of polymerization. With the lower molecular weight and lower degree of polymerization, the size of polymer particles becomes smaller, and the polymer can enter smaller pores and come into contact with the catalyst carried in the pores of the agglomerate structure of the carbon particles. In the case of a perfluorosulfonic acid polymer represented by formula (3) shown later, y is not more than 500, and more preferably 10 to 500.

As the polymer electrolyte, it is also possible to use an aromatic-based or aliphatic-based polymer having a sulfonic acid group. By using a hydrocarbon-based polymer electrolyte, it is possible to reduce the material cost compared to conventionally used fluorocarbon-based materials such as perfluorosulfonic acid polymer.

As described above, the present invention aims at improving the contact between the polymer electrolyte and the catalyst particles in the agglomerate structure of the conductive carbon particles, and thereby causing a larger surface of the catalyst to function as the active site of the reaction.

From this point of view, it is preferred that the catalyst particles of the present invention are present as particles of not smaller than 0.5 nm and not greater than 5 nm on the surface of the carbon particles, in the vicinity of a hydrogen ion conducting channel present in the layer of the hydrogen ion conductive polymer electrolyte. In other words, since not every part of the polymer electrolyte is used as the hydrogen ion conducting channel, only the catalyst particles present in the vicinity of the hydrogen ion conducting channel effectively contribute to the electrode reaction. In order to achieve such an arrangement of the catalyst, it is preferred to combine the catalyst with carbon particles by the following methods.

The first method for manufacturing electrodes for a polymer electrolyte fuel cell comprises the steps of joining a hydrogen ion conductive polymer electrolyte to at least a part of carbon particles having a primary particle size of not smaller than 10 nm and not greater than 150 nm; and depositing catalyst particles comprising platinum on the surface of the carbon particles near a hydrogen ion conducting channel present in the layer of the hydrogen ion conductive polymer electrolyte by immersing the carbon particles having the hydrogen ion conductive polymer electrolyte joined thereto in a solution containing platinum ions and performing electrolysis with the carbon particles as a negative electrode.

The second method for manufacturing electrodes for a polymer electrolyte fuel cell comprises the steps of adding an anionic functional group to at least a part of carbon particles having a primary particle size of not smaller than 10 nm and not greater than 150 nm; joining a hydrogen ion conductive polymer electrolyte to the surfaces of the carbon particles; and depositing catalyst particles comprising platinum on the surface of the carbon particles near a hydrogen ion conducting channel present in the layer of the hydrogen ion conductive polymer electrolyte by immersing the conductor having the hydrogen ion conductive polymer electrolyte joined thereto in a solution containing platinum ions.

Since the catalyst prepared on the surface of the carbon particles by these methods is in contact with the hydrogen ion conducting channel of the polymer electrolyte and effectively contributes to the electrode reaction, it is possible to provide an electrode exhibiting performance as good as or higher than the conventional performance with a smaller amount.

Regarding the catalyst layer which is optimized as described above, it is desirable in some case that the catalyst layer has a multilayer structure. If carbon monoxide is mixed in the fuel gas supplied to the polymer electrolyte fuel cell, platinum in the catalyst layer is poisoned and the activity is lowered. In order to prevent this disadvantage, it is preferred to use two catalyst layers and purify the carbon monoxide in the catalyst layer on the fuel supply side. Moreover, regarding the formation of a plurality of catalyst layers, a satisfactory result cannot be obtained by a method of coating a catalyst layer ink directly on the polymer electrolyte membrane or the diffusion layer by screen printing or the like.

The present invention provides a polymer electrolyte fuel cell in which the catalyst layer is composed of a plurality of layers which are discontinuous in a thickness direction.

In a preferred embodiment of the present invention, the catalyst layer comprises a first catalyst layer in contact with the hydrogen ion conductive polymer electrolyte membrane and a second catalyst layer formed on the first catalyst layer, wherein the catalyst component of the first catalyst layer is platinum, and the catalyst components of the second catalyst layer are platinum and at least one metal selected from the group consisting of ruthenium, palladium, rhodium, nickel, iridium, and iron. It is possible to purify the carbon monoxide mixed in the fuel gas by this second catalyst layer.

A preferred method for forming such a catalyst layer comprises the steps of: forming the first catalyst layer by applying an ink comprising first catalyst particles and hydrogen ion conductive polymer electrolyte onto a chemically inactive first base material; forming the second catalyst layer by applying an ink comprising second catalyst particles and hydrogen ion conductive polymer electrolyte onto a chemically inactive second base material; transferring the first catalyst layer to both of the front and back surfaces of the hydrogen ion conductive polymer electrolyte membrane; and transferring the second catalyst layer to at least one of the first catalyst layers on the hydrogen ion conductive polymer electrolyte membrane.

Another preferred method for forming the catalyst layer comprises the steps of: forming the second catalyst layer by applying an ink comprising second catalyst particles and hydrogen ion conductive polymer electrolyte onto a chemically inactive base material; forming the first catalyst layer by applying an ink comprising first catalyst particles and the hydrogen ion conductive polymer electrolyte onto the second catalyst layer; and transferring the first and second catalyst layers to at least one surface of the hydrogen ion conductive polymer electrolyte membrane.

The following description will explain some embodiments of the present invention with reference to the drawings.

Embodiment 1

FIG. 1 shows a schematic view of a model of ideally designed electrodes. A catalyst layer 2 of an electrode 1 comprises: conductive carbon particles 4 carrying catalyst particulates 3; and a polymer electrolyte 5 covering the surface of the carbon particles 4, and the carbon particles evenly adhere to each other while securing sufficient gas flow channels. By constructing each catalyst layer 2 in such a manner, it is possible to efficiently form three channels, namely a gas channels 7 functioning as a channel for supplying a fuel gas such as hydrogen and a liquid fuel, and an oxidant gas such as oxygen; a proton channel 8 formed by the water-containing polymer electrolyte membrane 5; and an electron channel 6 formed by mutual contact of carbon particles, very closely inside the same catalyst layer. In FIG. 1, 9 is a gas diffusion layer, and 10 is a polymer electrolyte membrane.

The supply of hydrogen and oxygen and the transfer of protons and electrons are smoothly performed in a wide range by a reaction represented by the following formula (1) at the anode, and a reaction represented by the following formula (2) at the cathode.

$$H_2 \rightarrow 2H^+ + 2e^- \quad (1)$$

$$\tfrac{1}{2}O_2 + 2H^+ + 2e^- \rightarrow 2H_2O \quad (2)$$

Therefore, the reaction rate and the reaction area increase, and a polymer electrolyte fuel cell exhibiting higher discharge performance can be realized.

As described above, the configuration of the carbon particles 4 in FIG. 1 has an aggregate structure consisting of primary particles united in a fused state, or an agglomerate structure consisting of physically or just secondary intertwined primary particles. The carbon particles generally used in a fuel cell form an agglomerate particle of 100 to 1000 nm obtained by further aggregation of aggregate structures consisting of 10 to 50 nm primary particles. The carbon particles 4 in FIG. 1 are agglomerate particles.

Figure 2:
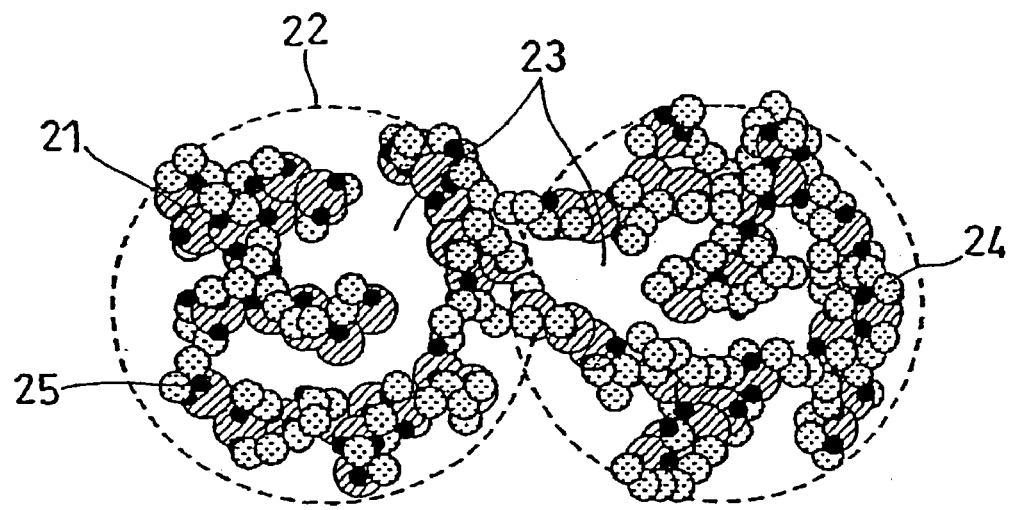
FIG. 2 is a concept view showing the relationship between the agglomerate structure of carbon particles and a polymer electrolyte in an example of the present invention.
Figure 3:
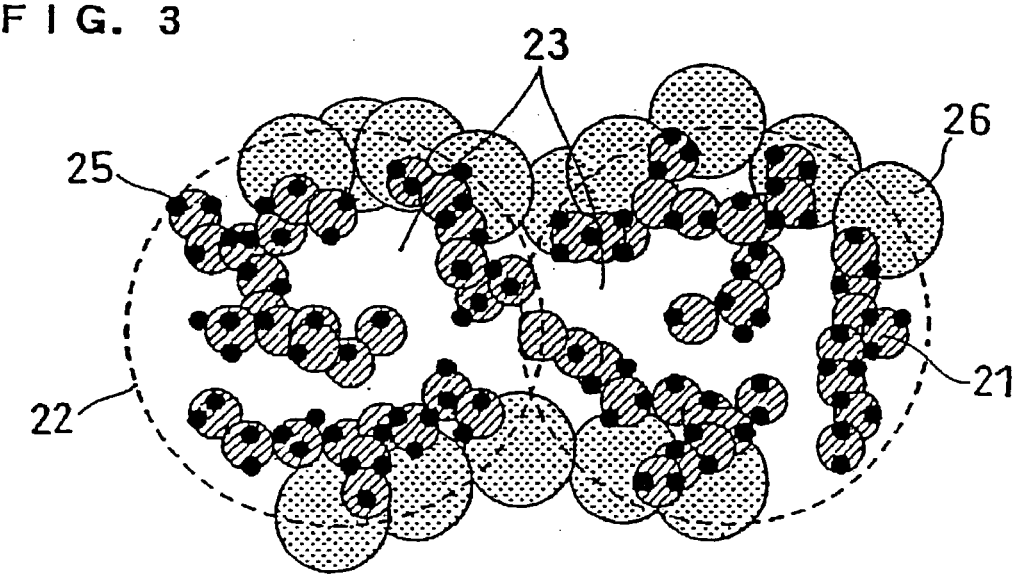
FIG. 3 is a concept view showing the relationship between the agglomerate structure of carbon particles and a polymer electrolyte in a comparative example.

FIG. 2 is a concept view showing the relationship between the agglomerate particle and the polymer electrolyte. FIG. 3 shows a conventional structure. In the conventional structure, the carbon particles generally used in a fuel cell form an agglomerate particle 22 of 100 to 1000 nm by further aggregation of aggregate structures consisting of 10 to 50 nm primary particles 21, and has 10 to 200 nm pores 23. When a polymer electrolyte 26 of a conventionally used perfluorocarbon sulfonic acid ionomer with a polymerization degree of about 1000 is used, since the size of the polymer is 40 to 1000 nm, the polymer is relatively larger than the pores 23 of the agglomerate particles 22 and cannot come into contact with many catalyst particles 25 carried in the pores.

On the other hand, in the structure of the present invention shown in FIG. 2, since the molecular weight and polymerization degree of the polymer electrolyte 24 are small, the size of the polymer electrolyte is as small as 5 to 40 nm, and can enter the 40 to 200 nm pores 23 in the agglomerate particle 22 and come into contact with the catalyst particles 25. Consequently, the reaction area of the catalyst increases significantly compared to the conventional structure, thereby improving the discharge characteristic of the fuel cell.

Moreover, by using a combination of carbon particles with 5 to 100 nm pores of the agglomerate and the polymer electrolyte of the present invention, the polymer electrolyte can come into contact with catalyst particles in the pores of the agglomerate or primary particles of smaller region. It is therefore possible to allow the catalyst which does not contribute to the reaction conventionally to function as an active site of the reaction, and thereby increase the reaction area and exhibit higher performance.

Embodiment 2

FIG. 4 is a concept view showing the relationship between the primary particles of the carbon particles and the polymer electrolyte used by the present invention. As shown in FIG. 4, most of the carbon particles also have pores 33 in the primary particles 31. The catalyst particles 35 have a particle size of 1 to 5 nm. Therefore, the catalyst particles 35 can be sufficiently carried in the pores 33 of the primary particles 31. However, as shown in FIG. 5(a), when the particle size of a polymer electrolyte 36 is larger than the pore 33, the polymer electrolyte 36 cannot enter the pores 33 and cannot come into contact with the catalyst 35 in the pores 33, and consequently the catalyst does not contribute to the reaction. Thus, when carbon particles having no pore in the primary particles as shown in FIG. 5(b) are used, waste of catalyst is reduced.

On the other hand, in the structure of the present invention as shown in FIG. 4, by using a polymer electrolyte 34 with a size smaller than the 1 to 10 nm pores 33 of the carbon particles 31, it is possible to make contact between the catalyst 35 in the pores and the polymer electrolyte 34 and enable the catalyst which does not contribute to the reaction conventionally to function as an active site of the reaction, thereby increase the reaction area and exhibit higher performance.

EXAMPLE 1

An ink for water repellent layer was prepared by mixing 10 to 70 wt % in dried weight of carbon particles (DENKA BLACK manufactured by Denki Kagaku Kogyo K.K.) into a water repellent agent (LUBRON LDW-40 manufactured by Daikin Industries, Ltd.). This ink was coated on one surface of carbon paper (TGPH060H manufactured by Toray Industries Inc.) serving as a base material of an electrode, and heated and dried at 350° C. by a hot-air drier so as to form a gas diffusion layer.

Next, an ink for catalyst layer was prepared. First, an acetylene black powder (DENKA BLACK manufactured by Denki Kagaku Kogyo K.K.) with an average primary particle size of 35 nm was caused to carry platinum particles with an average particle size of about 30 Å in a weight ratio of 50:50. The resultant powder was used as a catalyst for the cathode. Meanwhile, the same acetylene black as above was caused to carry platinum particles with an average particle size of about 30 Å and ruthenium particles in a weight ratio of 50:25:25. The resultant powder was used as the catalyst for the anode.

An ethyl alcohol dispersion of perfluorocarbon sulfonic acid ionomer (with an average molecular weight of 500,000 and an average polymerization degree of 500) was mixed into a liquid obtained by dispersing these catalyst powders in isopropanol so as to prepare a catalyst paste for the cathode side and a catalyst paste for the anode side. The weight ratio of each catalyst powder to the perfluorocarbon sulfonic acid ionomer was 96:4.

These pastes were applied to one surface of the gas diffusion layers and both surfaces of a hydrogen ion conductive polymer electrolyte membrane (Nafion 112 manufactured by E.I. du Pont de Nemours and Company, U.S.A.) with outside dimensions of 20 cm×32 cm. Then, an MEA was produced by sandwiching the electrolyte membrane between a pair of gas diffusion layers so that the surfaces coated with the same paste were in contact with each other and joining them together by application of pressure and heat using a hot-pressing technique. At this time, the electrolyte membrane of a size slightly larger than the gas diffusion layer was used so as to prevent electrical short circuit between the gas diffusion layers at the edges.

Next, gasket plates made of rubber were joined to the periphery of the hydrogen ion conductive polymer electrolyte membrane of the MEA, and manifold apertures for the passage of cooling water, fuel gas and oxidant gas were formed.

Conductive separator plates made of resin-impregnated graphite plates with outside dimensions of 20 cm×32 cm and a thickness of 1.3 mm were prepared. Formed in the separator plates were manifold apertures for the passage of cooling water, fuel gas and oxidant gas, connected to manifold apertures formed in the MEA for the passage of cooling water, fuel gas and oxidant gas. Furthermore, grooves with a depth of 0.5 mm for the passage of gases were formed on the surfaces of the separator plates facing the cathode and the anode. A cell stack composed of 100 cells was assembled by stacking these separator plates and MEAs alternately. However, a cathode-side separator plate and an anode-side separator plate, each having a cooling water flow channel on the rear surface thereof, were inserted every two cells, instead of the above-mentioned separator plate, so as to form cooling sections. Current collector plates made of stainless steel, insulating plates made of an electrically insulating material, and end plates were arranged on both ends of the cell stack, and the end plates were fastened together with clamping rods. The clamping pressure per area of the separator plates was 15 kgf/cm$^2$. A fuel cell thus produced is denoted as A.

EXAMPLE 2

In this example, a fuel cell was produced using Ketjen Black EC (available from AKZO Chemie, Netherlands), conductive carbon particles with an average primary particle size of 30 nm, as carbon for carrying a catalyst. Other structures and the manufacturing method are the same as in Example 1. This fuel cell is denoted as B.

Moreover, a similar fuel cell was produced using Ketjen Black 600JD (available from AKZO Chemie, Netherlands), conductive carbon particles with an average primary particle size of 30 nm, as carbon for carrying a catalyst. This fuel cell is denoted as C.

COMPARATIVE EXAMPLE 1

In Example 1, perfluorocarbon sulfonic acid ionomer (with an average molecular weight of 500,000 and an average polymerization degree of 500) was used when producing the catalyst pastes. In the comparative example, instead of this, perfluorocarbon sulfonic acid with an average polymerization degree of 1000 (Nafion manufactured by Aldrich Chemical Co., Inc., U.S.A.) was used. Other structures and the manufacturing method are the same as in Example 1. The fuel cell of Comparative Example 1 is denoted as X.

Further, a fuel cell was produced in the same manner as for the fuel cell B of Example 2, except that the perfluorocarbon sulfonic acid with an average polymerization degree of 1000 (Nafion manufactured by Aldrich Chemical Co., Inc., U.S.A.) was used for the hydrogen ion conductive polymer electrolyte that is a component of the catalyst layer. This cell is denoted as cell Y of the comparative example.

Characteristic Evaluation

The characteristics of the above-mentioned fuel cells were evaluated by the following method.

Figure 6:
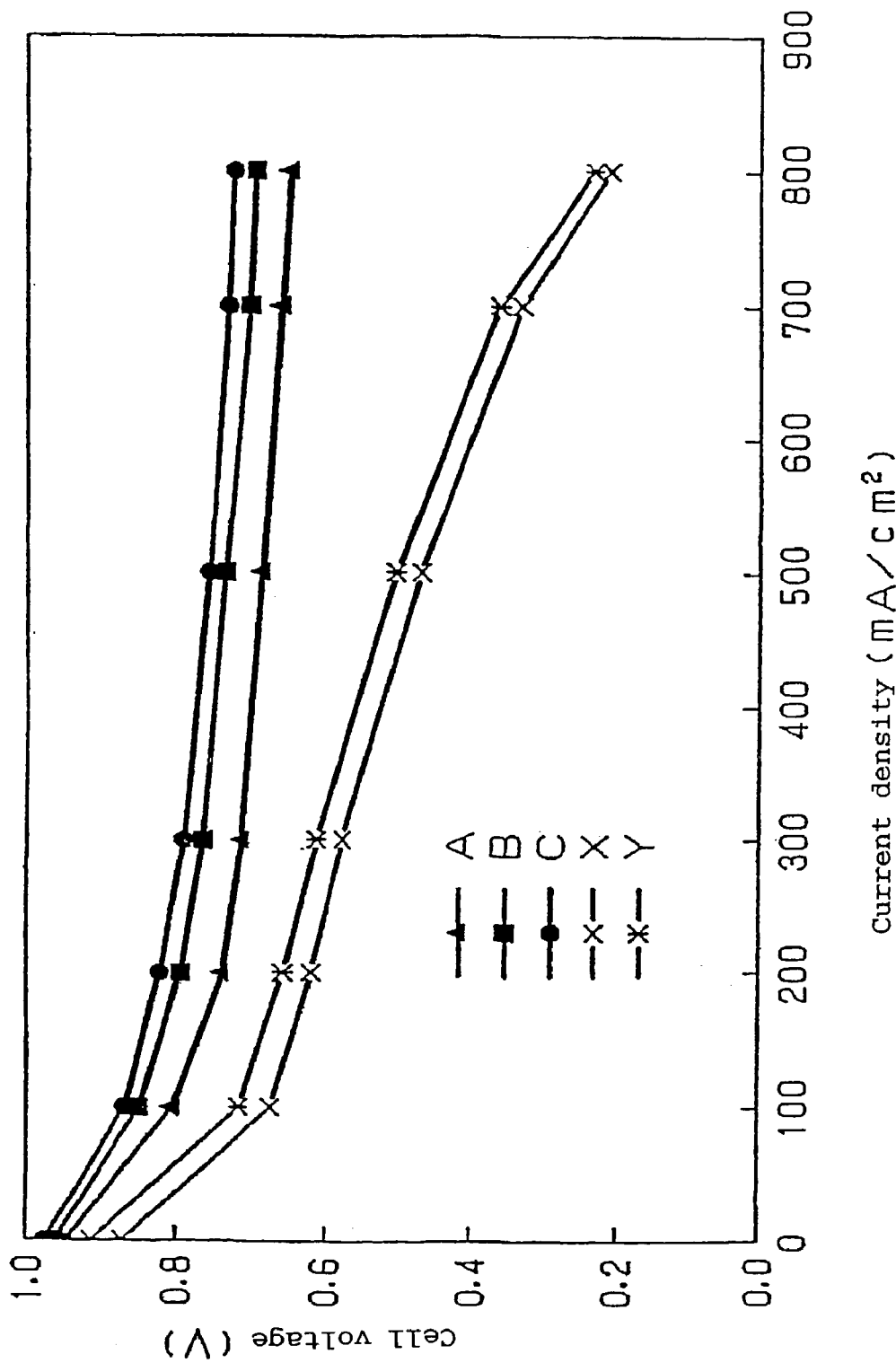
FIG. 6 is a graph showing the relationship between current-voltage and current density of fuel cells of an example of the present invention and a comparative example.

Each fuel cell was maintained at 75° C., and a pure hydrogen gas was supplied to the anode through a bubbler of 60 to 70° C., while the air was supplied to the cathode through a bubbler of 45 to 70° C. The fuel gas utilization ratio was 70%, and the air utilization ratio was 40%. FIG. 6 shows the relation between the current density and the voltage per unit cell.

Besides, the characteristics of the cells using methanol as the fuel were also evaluated. An aqueous solution of 2 mol/l methanol as a typical example of liquid fuel was supplied to the anode at 60° C., while the air was supplied to the cathode through a bubbler of 45 to 70° C., and the discharge tests of direct methanol fuel cells were performed under the conditions that the fuel gas utilization ratio was 75% and the air utilization ratio was 40%. The results are shown in FIG. 7.

As shown in FIG. 6, the unit cell voltages at the current density of 300 mA/cm$^2$ of the fuel cells A, B, C, X and Y were 712 mV, 768 mV, 791 mV, 578 mV, and 612 mV, respectively.

The polymer electrolyte used in the fuel cells A, B, and C of the present invention had a smaller molecular weight and smaller polymerization degree compared to that used in the comparative examples, and consequently had smaller molecular size. Therefore, as shown in FIG. 2, it was possible to cause the catalyst in the agglomerate of the carbon particles to effectively contribute to the reaction, and exhibit high discharge characteristics compared to the cells X and Y of the comparative examples. Moreover, the cells B and C exhibited higher discharge characteristics compared to the cell A. This was achieved by enabling the catalyst carried in the pores of the primary particles of the carbon particles to react effectively as shown in FIG. 4.

Figure 7:
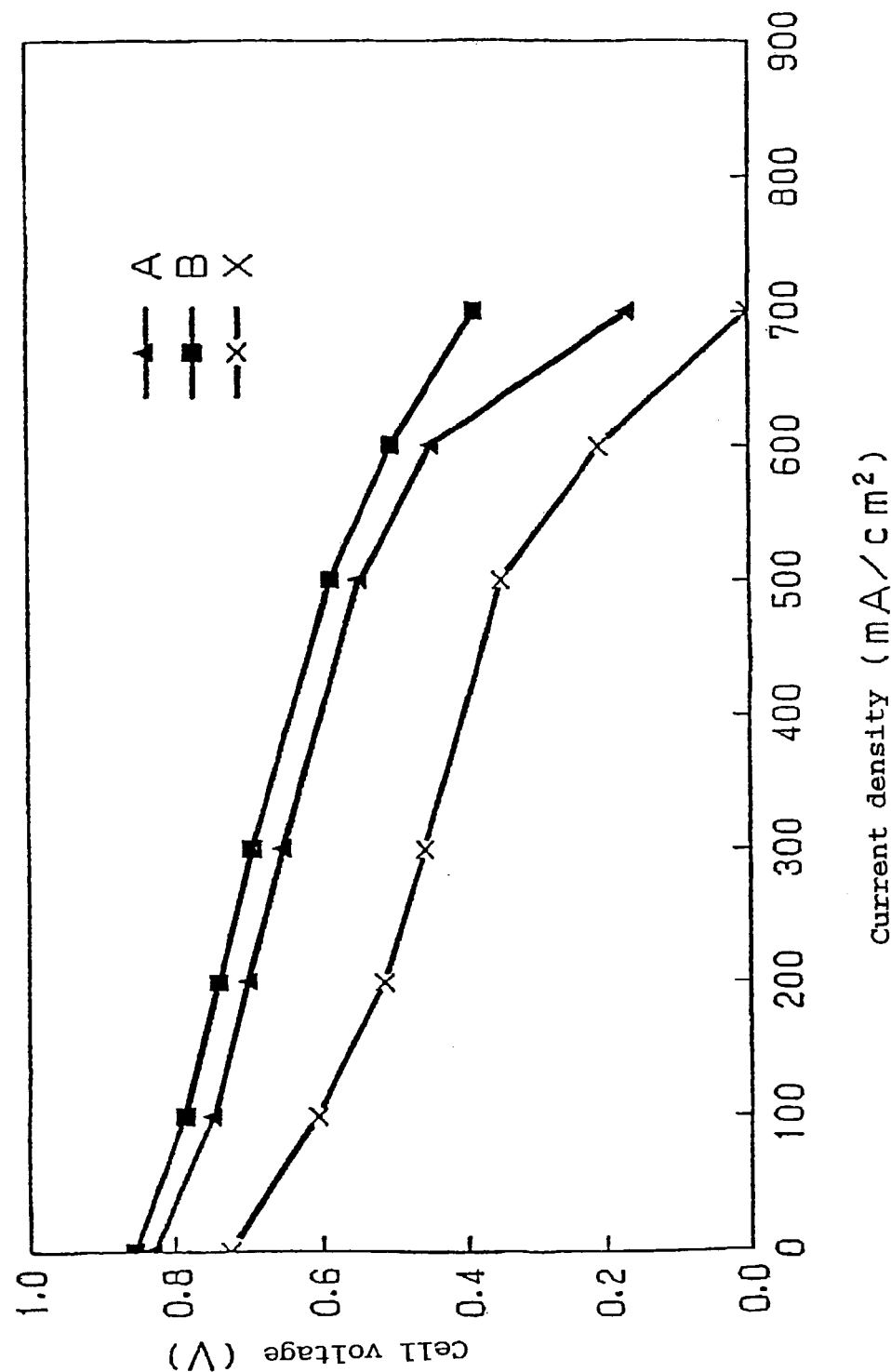
FIG. 7 is a graph showing the relationship between current-voltage and current density of liquid fuel cells of an example of the present invention and a comparative example.

FIG. 7 shows the discharge characteristics of the cells A, B and X as the liquid fuel cells. The unit cell voltages of the cells A, B, and X at the current density of 200 mA/cm$^2$ were 704 mV, 743 mV, and 518 mV, respectively.

As clear from FIG. 7, the effects of the hydrogen-air fuel cells shown in FIG. 6 are also exhibited similarly by the liquid fuel cells.

EXAMPLE 3

Fuel cells were produced in the same manner as in Example 1 by using Vulcan XC-72R and Black pearls 2000 manufactured by Cabot, U.S.A., Conductex 975 manufactured by Columbian Chemicals Company, U.S.A., and acetylene black product Nos. AB1, AB2, AB3 and AB18 manufactured by Denki Kagaku Kogyo K.K. as typical examples of carbon particles with pores in the agglomerate structure having a peak between 5 and 100 nm. These carbon particles are represented by letters f, g, h, I, j, k and l, respectively. When these cells were evaluated by the same method as in Example 1, they exhibited characteristics as good as the cell A.

Figure 8:
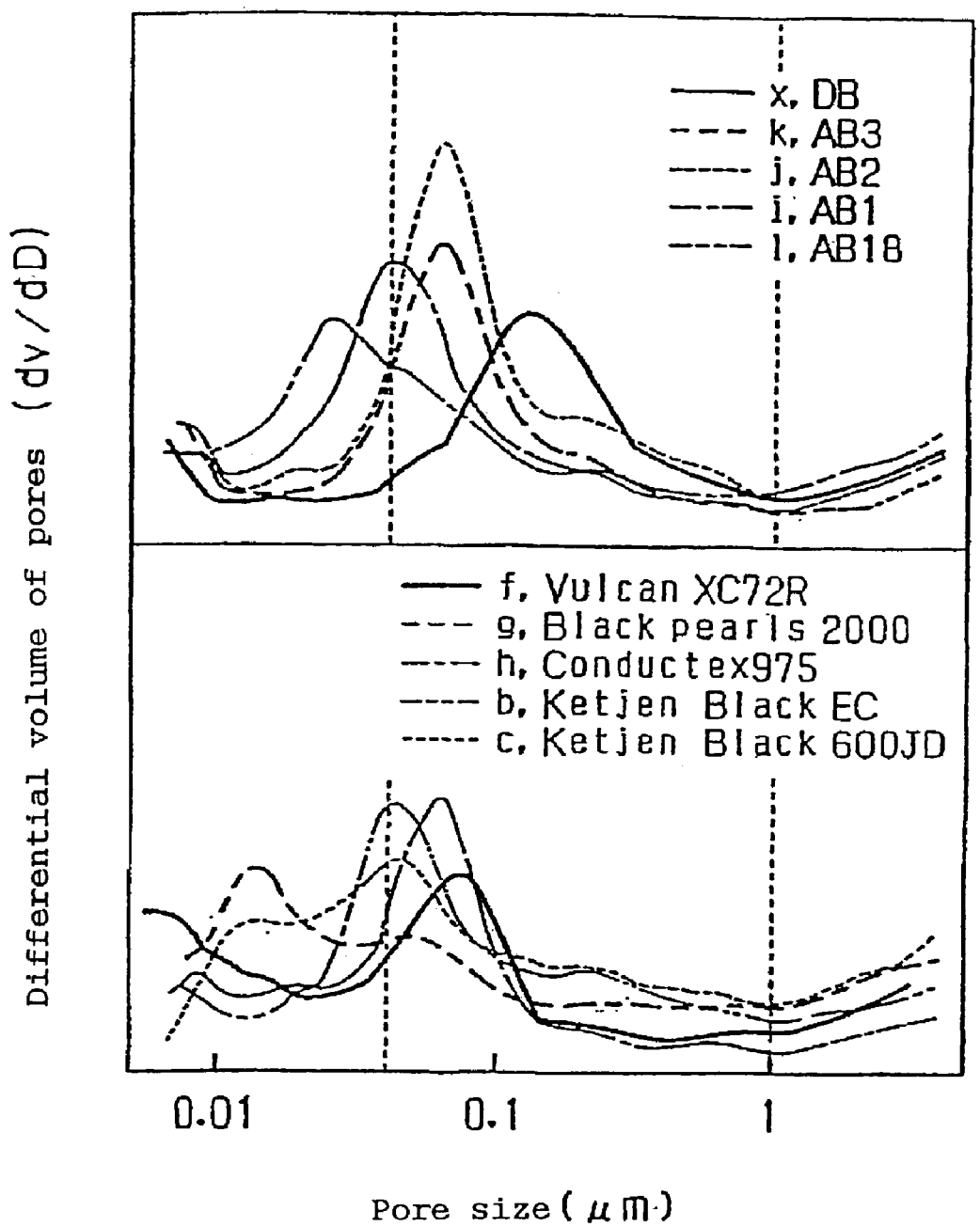
FIG. 8 is a graph showing the relationship between pore distributions of various carbon particles and pore size measured by a mercury penetration method.

The pore distribution of the various carbon particles used in the above-mentioned cells were measured by a mercury penetration method using AoToPore 9220 manufactured by Micromeritics. The results are shown in FIG. 8. In addition, the obtained pore size peak and the specific surface area are shown in Table 1. The carbon particles used in the cells B, C and X are represented by letters b, c and x, respectively.

TABLE 1

| Carbon Particles | Cell Number | Specific Surface Area (m$^2$/g) | Pore Size Peak (nm) |
|---|---|---|---|
| Denka Black | x | 58 | 200 |
| AB3 | k | 135 | 40 |
| AB2 | j | 209 | 70 |
| AB1 | i | 373 | 70 |
| AB18 | l | 835 | 25 |
| Vulcan XC-72R | f | 254 | 80 |
| Black pearls 2000 | g | 1480 | 15 |
| Conductex 975 | h | 250 | 60 |
| Ketjen Black EC | b | 800 | 40 |
| Ketjen Black 600 JD | c | 1270 | 50 |

As shown in FIG. 8 and Table 1, there is a big difference in the pore distribution depending on the carbon particles. Compared to the carbon particles x of the comparative example that has the pore peak in a region (40 to 1000 nm) where the conventional polymer electrolyte ionomer is distributed, all the carbon particles used in the examples of the present invention have the pore peak between 5 and 100 nm. Thus, the function and effect explained in Embodiment 1 were confirmed.

Figure 9:
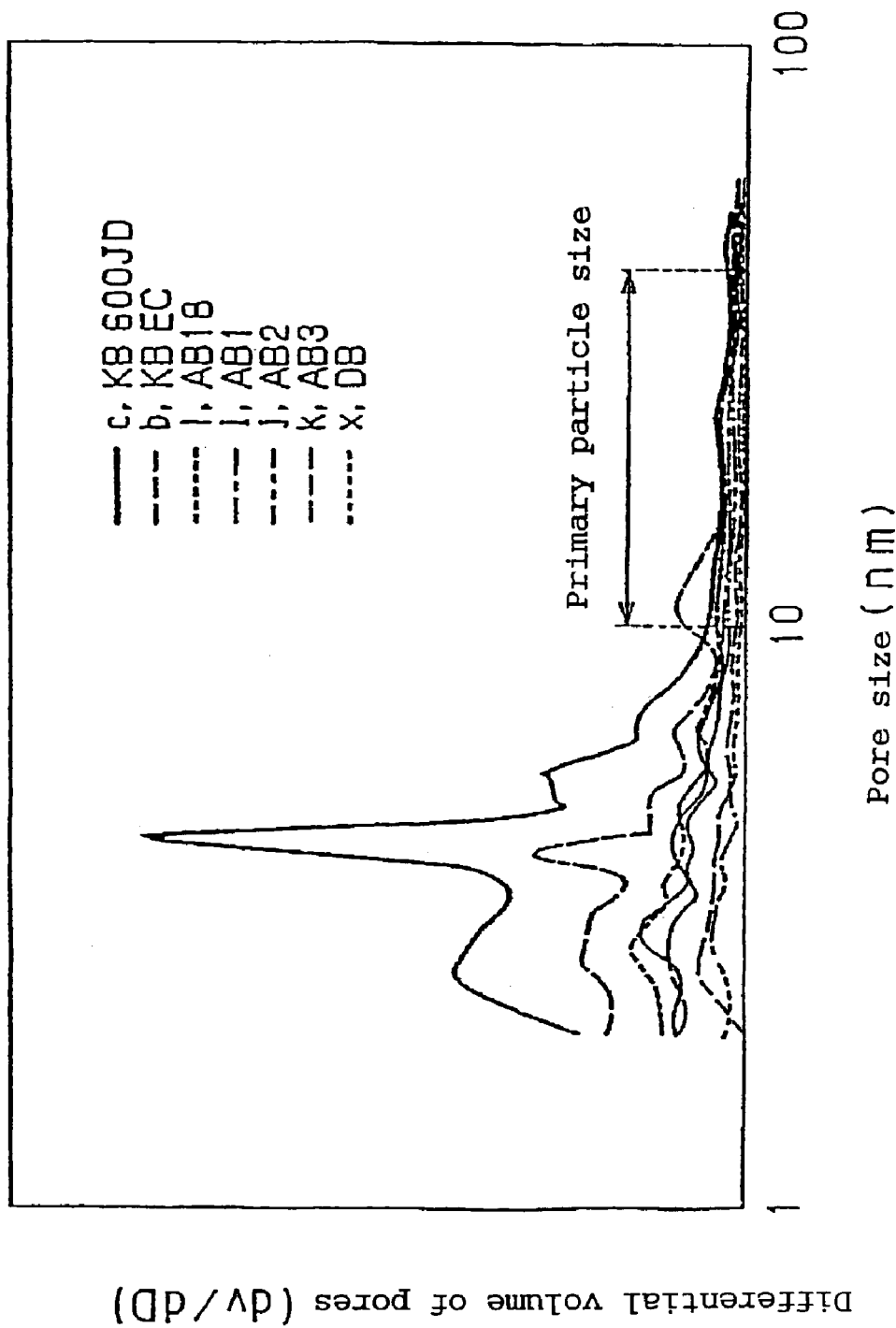
FIG. 9 is a graph showing the relationship between pore distributions and pore size of various carbon particles measured by a nitrogen adsorption method.

Moreover, the pore distribution of the above-mentioned carbon particles were measured by a nitrogen permeation method (BJH method) using Sorptomatic 1800 manufactured by Carlo Erba Reagenti. The results are shown in FIG. 9. In FIG. 9, most of the pores of the carbon particles had a diameter of not greater 10 nm. Since the primary particle size of the carbon particles is between 10 and 50 nm, most of the pores are present on the primary particle surface. Furthermore, the larger the specific surface area of the carbon particles used in the examples, the larger the pore volume, and thus the surface area is composed mostly of pores with a diameter of not greater than 10 nm. Therefore, the larger the number of pores in the carbon particles, the greater the amount of catalyst metal particles carried in the pores. Accordingly, the carbon particles used in the cell X of the comparative example has a small area carrying catalyst and a small total reaction area as illustrated in FIG. 5(*b*) of Embodiment 2. Moreover, for the carbon particles c, b, l, i, j and k, by using the polymer electrolyte smaller than the pores of 1 to 10 nm, it was possible to make contact between the catalyst and the polymer electrolyte in the pores. Consequently, since it was possible to cause the catalyst which did not contribute to the reaction conventionally to function as an active site of the reaction, the reaction area increased and higher performance was exhibited.

Except for using aromatic-based and aliphatic-based polymers having a sulfonic acid group in place of the perfluorosulfonic acid polymer-based polymer electrolyte used in the above examples, the cells having the same structures as above were produced and evaluated under the same conditions. Consequently, the same results as above were obtained for the correlations among the molecular weight, polymerization degree and particle size of the polymer electrolyte and the pore structure of the carbon particles.

As typical examples of the aromatic-based polymer and aliphatic-based polymer having sulfonic, acid groups, a composite polymer of polythiophenylene sulfonic acid and polyanyline, polydiphenyl amine, polyphenylene derivative {poly(4-phenoxybenzoil-1,4-phenylene)}, poly(benzimidazole)butanesulfonic acid, poly(silamine), styrene/ethylenebutylene/styrene triblock copolymer, polyether ether ketone, etc. were used.

Since the polymer electrolyte of the above example can be produced from fluorine-based material by various multipurpose processes, it has the advantage of low material cost. During the process of decomposing the used fuel cells, since extremely corrosive decomposed products such as fluoric acid are not generated in the step of collecting catalyst metal by baking, etc., these cells can be easily recycled and have the advantage of reducing the cost. Accordingly, the total cost from the production of material to decomposition/recycling can be reduced.

In the above examples, while hydrogen and methanol were used as an example of the fuel, it is possible to obtain similar results by fuels using reformed hydrogen as the hydrogen and containing impurities such as carbonic acid gas, nitrogen and carbon monoxide, and it is also possible to obtain similar results by using liquid fuels such as ethanol and dimethyl ether or a mixture thereof in place of methanol. Further, it is possible to evaporate a liquid fuel in advance and supply it as vapor.

It is effective to apply the polymer electrolyte and electrode assembly of the present invention to gas generators and gas purifiers for oxygen, ozone and hydrogen, and to various gas sensors such as oxygen sensors and alcohol sensors.

EXAMPLE 4

First, a carbon black powder was used as the carbon particles having a primary particle size of not smaller than 10 nm and not greater than 150 nm, and a perfluorosulfonic acid having the chemical structure represented by the following formula (3) was used as the hydrogen ion conductive polymer electrolyte. In the formula (3), m=1, n=2, $5 \leq x \leq 13.5$, y=1000.

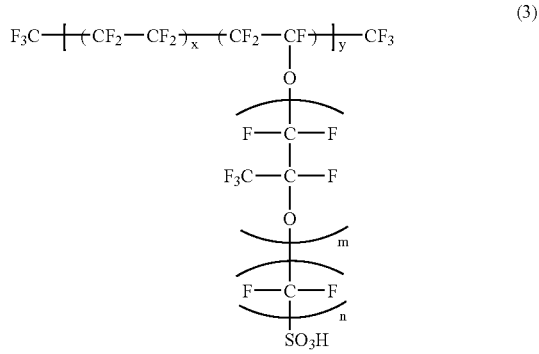

(3)

80 parts by weight of ethanol in which 9 wt % hydrogen ion conductive polymer electrolyte was dispersed was mixed in a ball mill with 20 parts by weight of the carbon powder so as to prepare an ink for producing electrodes. Next, an ethanol in which 9 wt % hydrogen ion conductive polymer electrolyte was dispersed was casted on a smooth glass substrate, and dried to obtain a hydrogen ion conductive polymer electrolyte membrane with an average film thickness of 25 μm.

Next, a 10 μm thick porous carbon fabric made of carbon fibers with an average fiber diameter of 5 μm was attached to both surfaces of the hydrogen ion conductive polymer electrolyte membrane, and the ink for producing electrodes was screen printed on the porous carbon fabric. Thus, a membrane/electrode assembly composed of the porous carbon fabrics, carbon particles and hydrogen ion conductive polymer electrolyte provided on both surfaces of the hydrogen ion conductive polymer electrolyte membrane was obtained. The membrane/electrode assembly was heated in a saturated vapor atmosphere at 120° C. for 1 hour so as to sufficiently develop the hydrogen ion conducting channel in the electrode layers.

Here, when the hydrogen ion conductive polymer electrolyte shown in the formula (3) is heated under a humid atmosphere at a relatively high temperature of not lower than about 100° C., hydrogen ion conducting channels develop as hydrophilic channels and form a reverse micelle structure.

Next, the membrane/electrode assembly was immersed in an aqueous solution of 0.1 M chloroplatinic acid, and a negative electric potential was applied to the electrode portion of the membrane/electrode assembly with the porous carbon fabric as the current collector by using a platinum plate as the counter electrode so as to perform electrolytic reduction at a fixed current density of 10 mA/cm².

Figure 10:
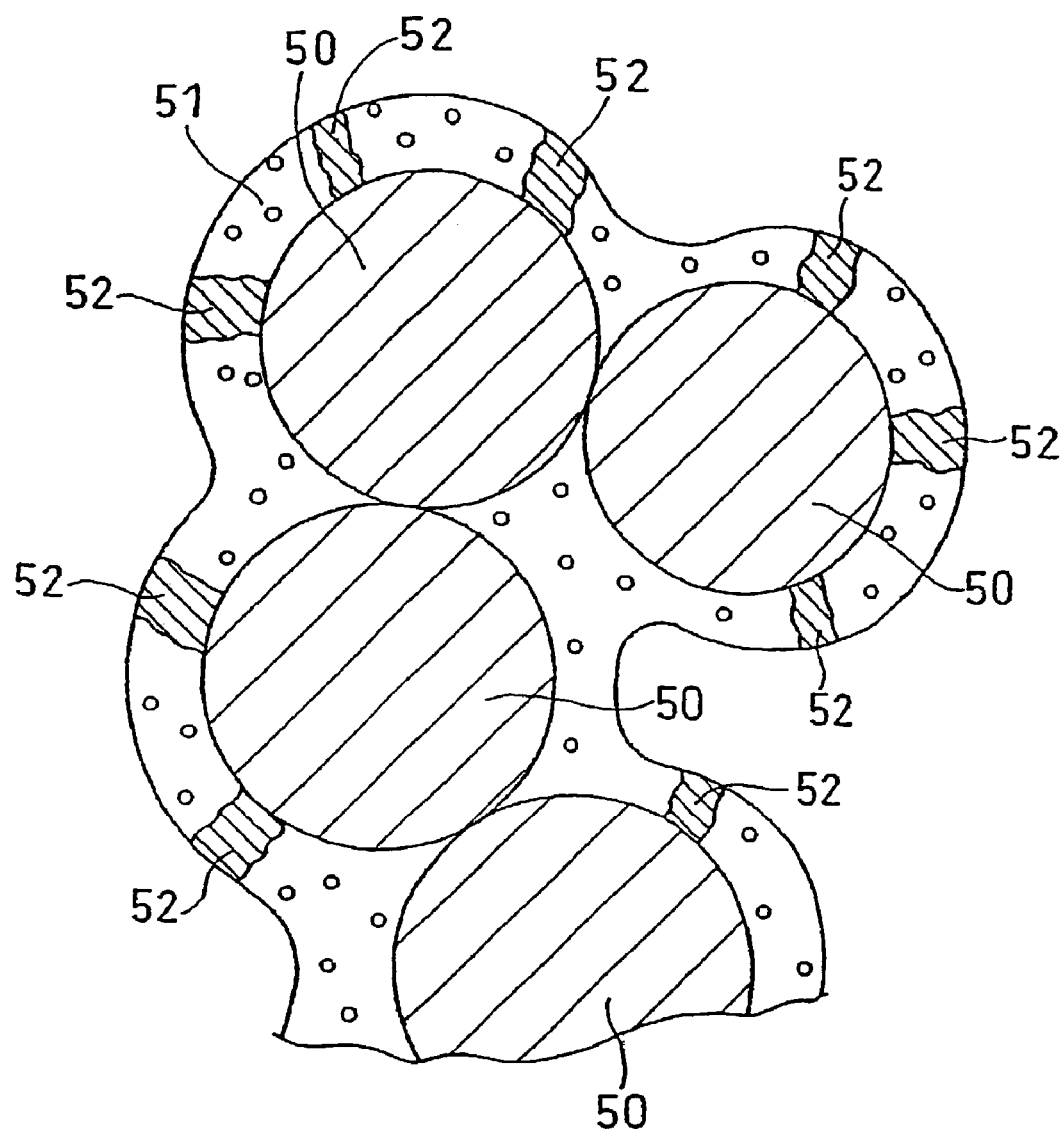
FIG. 10 shows a model of carbon particles before deposition of catalyst particles of a catalyst layer and a polymer electrolyte.

At this time, on the hydrogen ion conductive polymer electrolyte formed on the surface of carbon particles constituting the electrodes of the membrane/electrode assembly, the hydrogen ion conducting channels were formed as shown in FIG. 10, and the sulfonic acid group shown in the formula (3) forms the reverse micelle structure in these portions to exhibit the hydrogen ion conductivity. Therefore, when the membrane/electrode assembly is immersed in the aqueous solution of chloroplatinic acid, ion exchange occurs between protons of the sulfonic acid group present in the hydrogen ion conducting channel in the hydrogen ion conductive polymer electrolyte and platinum ions, and further metallic platinum is deposited selectively on the surface of carbon particles in the hydrogen ion conducting channel by electrolytic reduction.

In some cases, the platinum ions are reduced and deposited directly on the surface of the carbon particles where hydrogen ion conducting channel is present, without ion exchange with the proton of the sulfonic acid group of the hydrogen ion conductive polymer.

In either case, with a technique of the present invention, it is possible to cause the catalyst for the electrode reaction to selectively adhere to the surface of the carbon particles in a portion where the hydrogen ion conducting channel of the polymer electrolyte is present. Moreover, with the electrolytic reduction at a low current density as described above, it is possible to control the amount of the carried catalyst by controlling the electrolysis time. Since the catalyst particles thus adhered face the hydrogen ion conducting channel of the polymer electrolyte, the utilization ratio of the catalyst is significantly improved compared to conventional electrodes in which a polymer electrolyte is joined to carbon particles carrying a catalyst.

Next, after immersing the membrane/electrode assembly in an aqueous solution of 0.1 M sulfuric acid so as to ion exchange the non-reacted platinum ions, which were ion exchanged with the sulfonic acid group in the hydrogen ion conducting channel, with protons again, the membrane/electrode assembly was sufficiently washed with deionized water and dried in the air. Subsequently, only one electrode surface was immersed in an aqueous solution of 0.1 M ruthenium nitrate and electrolytic reduction was performed by the same technique as in the case of immersing it in the aqueous solution of chloreplatinic acid so as to deposit metallic ruthenium only on the surface of one of the electrodes of the membrane/electrode assembly, and then the membrane/electrode assembly was sufficiently washed with deionized water.

Furthermore, this membrane/electrode assembly was subjected to heat treatment at 120° C. in the air atmosphere so as to alloy platinum and ruthenium carried on one surface of the membrane/electrode assembly, and this surface was used as an electrode catalyst for anode. Note that, by repeating the deposition of platinum and ruthenium several times while adjusting the time for depositing platinum and ruthenium by electrolysis, even if the heat treatment is omitted, to sufficiently alloy platinum and ruthenium.

In this manner, the membrane/electrode assembly having the electrodes with outside dimensions of 16 cm×20 cm containing carbon particles carrying the catalyst, joined to both of the back and front surfaces of the hydrogen ion conductive polymer electrolyte membrane with outside dimensions of 20 cm×32 cm, was obtained. This membrane/electrode assembly was sufficiently washed with deionized water. The amount of platinum contained in the electrode was adjusted to 0.03 mg/cm$^2$. The average thickness of the electrode catalyst layer was 10 μm.

On the other hand, carbon paper to be a diffusion layer was subjected to water repellent treatment. After immersing carbon non-woven fabric (TGP-H-120 manufactured by Toray Industries Inc.) with outside dimensions of 16 cm×20 cm and a thickness of 360 μm in an aqueous dispersion of fluorocarbon resin (Nefron ND1 manufactured by Daikin Industries, Ltd.), it was dried and heated for 30 minutes at 380° C. so as to impart water repellency. Furthermore, a water repellent layer was formed by applying a paste ink, which was produced by mixing a conductive carbon powder with water in which PTFE fine powder as a water repellent agent was dispersed, to one surface of this carbon non-woven fabric by a screen printing technique. A part of the water repellent layer was buried in the carbon non-woven fabric.

Next, an MEA was produced by joining a pair of diffusion layers to the membrane/electrode assembly by hot pressing so that the surfaces to which the water repellent layers were applied were located the electrolyte membrane side. Gasket plates made of rubber were joined to the periphery of the hydrogen ion conductive polymer electrolyte membrane of the MEA, and manifold apertures for the passage of cooling water, fuel gas and oxidant gas were formed.

A cell stack composed of 100 cells was produced by combining the MEA with separator plates similar to those used in Example 1.

The polymer electrolyte fuel cell thus produced was maintained at 80° C., and a methane steam reformed gas which was humidified and heated to a dew point of 75° C. and had carbon monoxide concentration reduced to 50 ppm or less was supplied to the anode, while the air humidified and heated to a dew point of 50° C. was supplied to the cathode. As a result, an open circuit voltage of 98 V was obtained during no load at which a current was not outputted to the outside.

This cell was subjected to continuous heat generation test under the conditions that the fuel gas utilization ratio was 85%, the oxygen utilization ratio was 60% and the current density was 0.7 A/cm$^2$ so as to measure the change in the output characteristic with time. As a result, it was confirmed that the cell of this example maintained an output of about 14.6 kW (65 V–224 A) over 8000 hours.

A polymer electrolyte fuel cell comprising an electrode having a catalyst layer formed by a conventional method was produced for a comparison purpose. In other words, an ink for producing electrodes was prepared by causing a carbon black powder to carry platinum particles with an average particle size of about 25 Å in a weight ratio of 50:50 and mixing it with an ethanol dispersion of the hydrogen ion conductive polymer electrolyte. The fuel cell was produced in the same manner as in the example except that the method of carrying the catalyst metal was changed as described above. In this cell, the amount of platinum contained in the catalyst layer was 0.3 mg/cm$^2$, and the amount of perfluorocarbon sulfonic acid was 1.2 mg/cm$^2$. In the same conditions as above, this cell maintained a cell output of about 14.4 kW (64.5 V–224 A) over 8000 hours.

Thus, the cell with 0.3 mg/cm$^2$ of platinum carried in the catalyst layer obtained by the conventional method and the cell with 0.03 mg/cm$^2$ of platinum of this example exhibited substantially the same performances and life characteristics. Consequently, it was verified that the present invention has the effects of significantly improving the platinum utilization ratio and reducing the amount of the carried platinum about a one-digit scale.

EXAMPLE 5

A fuel cell was produced in the same manner as in Example 4, except that y=500 in the formula (3). The amount of platinum contained in the electrode was adjusted to 0.02 g/cm$^2$. This cell exhibited an output of about 14.8 kW (66.1 V–224 A) under the same conditions. By decreasing the molecular weight or the polymerization degree of the polymer electrolyte, the pores of the carbon fine particles in the catalyst layers became more effective, and consequently the particle size of the catalyst metal particles decreased and the reaction area increased. As a result, even when the electrodes with the amount of catalyst further reduced by about 33% are used, it is possible to obtain equal or better cell performance.

EXAMPLE 6

First, a carbon black powder was used as carbon particles with an average primary particle size of not smaller than 10 nm and not greater than 150 nm. This carbon black powder was kept at 400° C. for 1 hour in a steam atmosphere so as to add anionic functional groups to at least a part of the surface of the carbon black. It was confirmed that the anionic functional groups were mainly hydroxyl groups and carboxyl groups. The anionic functional group can be added by various methods such as subjecting the carbon particles to heat treatment in the air atmosphere; exposing the carbon particles in an ozone atmosphere; irradiating the carbon particles with ultraviolet rays; subjecting the carbon particles to plasma treatment; and immersing the carbon particles in an acid; etc. Equal effects can be obtained by these methods.

As the hydrogen ion conductive polymer electrolyte, a perfluorosulfonic acid having the chemical structure shown by the formula (3) was used.

20 parts by weight of the carbon black powder with the anionic functional groups added thereto was mixed in a ball mill with 80 parts by weight of ethanol in which 9 wt % hydrogen ion conductive polymer electrolyte was dispersed, and the resultant mixture was dried and then ground. After adding the anionic functional groups to the surface of the carbon particles in this manner, the powder to which the hydrogen ion conductive polymer electrolyte was joined was obtained. Next, a heat treatment was applied to this powder at 120° C. for 1 hour in a saturated steam atmosphere to develop the hydrogen ion conducting channel sufficiently.

Then, the powder was immersed in an aqueous solution of 0.1 M chloroplatinic acid. At this time, on the hydrogen ion conductive polymer electrolyte formed on the surface of carbon particles constituting the powder, the hydrogen ion conducting channels were formed as shown in FIG. 10, and the sulfonic acid group shown in the formula (3) formed the reverse micelle structure in these portion to exhibit the hydrogen ion conductivity.

Thus, when the powder is immersed in the aqueous solution of chloroplatinic acid, platinum ions in the aqueous solution of chloroplatinic acid are ion exchanged with protons of the sulfonic acid group present in the hydrogen ion conducting channel in the hydrogen ion conductive polymer electrolyte, and the ion exchange reaches the surface of the carbon particles in a chained manner and finally the platinum ions are ion exchanged with protons of the anionic functional group present on the surface of the carbon particles or react with the anionic functional group to form a platinum oxide compound.

In this manner, after fixing platinum in the hydrogen ion conducting channel on the surface of the carbon particles, the powder was sufficiently washed with deionized water, and the powder carrying the catalyst was obtained. Next, the powder carrying the catalyst was mixed into an aqueous solution of 0.1 M sulfuric acid in which two platinum plate electrodes were immersed while stirring, and then a voltage was applied across the two platinum plate electrodes and electrolytic reduction was performed at a constant current density of 10 mA/cm$^2$.

At this time, when the powder carrying the catalyst floating in the aqueous solution of sulfuric acid come into contact with the negative-side platinum electrode, platinum ions are reduced and carried on the surface of the carbon particles as metallic platinum. Regarding a method of reducing platinum ions, by performing heat treatment in a reduced atmosphere at around 100° C. to 150° C., the same effects can also be obtained.

Next, after drying the powder carrying the catalyst subjected to the reducing treatment, the powder and butanol were mixed in a ball mill to prepare an ink for producing electrodes. Then, an ethanol in which 9 wt % hydrogen ion conductive polymer electrolyte was dispersed was casted on a smooth glass substrate and dried to obtain a hydrogen ion conductive polymer electrolyte membrane with an average film thickness of 25 μm.

Next, the ink for producing electrodes was screen-printed on both surfaces of the hydrogen ion conductive polymer electrolyte membrane so as to obtain a membrane/electrode assembly composed of the carbon particles carrying the catalyst and the hydrogen ion conductive polymer electrolyte on both surfaces of the hydrogen ion conductive polymer electrolyte membrane.

In this manner, the membrane/electrode assembly having the electrodes with outside dimensions of 16 cm×20 cm containing the carbon particles carrying the catalyst, joined to both of the back and front surfaces of the hydrogen ion conductive polymer electrolyte membrane with outside dimensions of 20 cm×32 cm, was obtained. The amount of platinum contained in the electrode was 0.03 mg/cm$^2$, and the average thickness of the electrode catalyst layer was 10 μm.

An MEA was produced by combining the membrane/electrode assembly with diffusion layers similar to Example 4, and an stack composed of 100 cells was produced in the same manner as in Example 4. This cell maintained an output of about 14.7 kW (65.5 V–224 A) over 8000 hours under the same conditions as above.

EXAMPLE 7

Two kinds of inks for electrodes were prepared. A carbon powder was caused to carry platinum in a weight ratio of 75:25, and a dispersion of 5 wt % hydrogen ion conductive polymer electrolyte (Nafion solution manufactured by Aldrich Chemical Co., Inc., U.S.A.) and 2-propanol and terpineol as solvents were added to the carbon powder and mixed by a ball-mill technique so as to prepare an electrode ink A. In addition, platinum and ruthenium were carried on a carbon powder in a weight ratio of 25:25:50. The same dispersion of hydrogen ion conductive polymer electrolyte, 2-propanol and terpineol were added to the carbon powder and mixed in the same manner as above so as to prepare an electrode ink B.

These inks were coated on base materials to form catalyst layers. For the base material, a polyester film with a thickness of 50 μm and a width of 250 mm was used.

Figure 11:
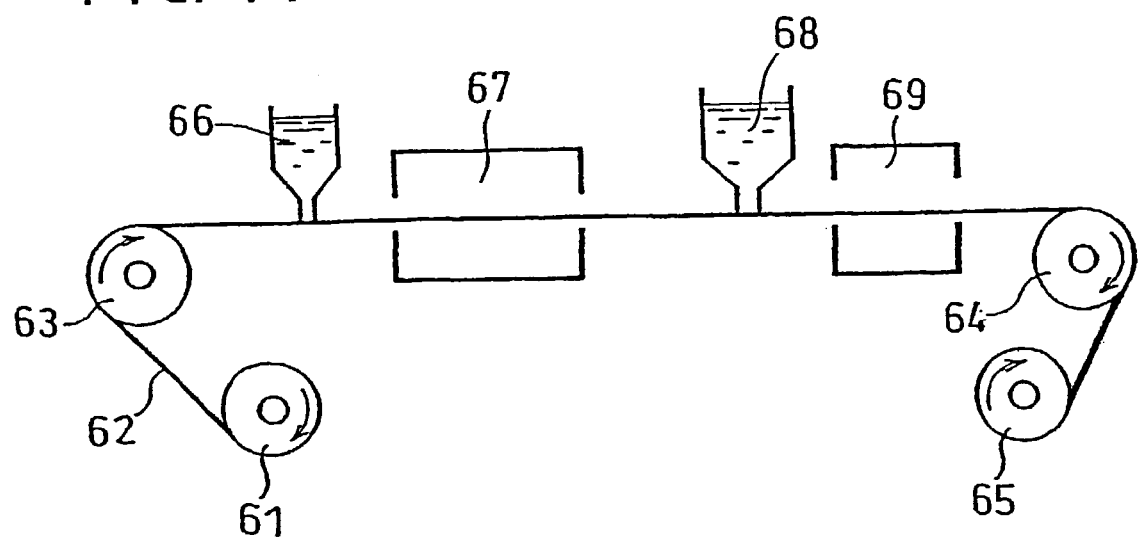
FIG. 11 is a schematic structure of an apparatus for coating the catalyst layer on a base sheet.

FIG. 11 shows a coater. A base material film 62 fed from a roller 61 is rolled around a roller 65 through support rollers 63 and 64. Provided between the rollers 63 and 64 are paint tanks 66 and 68 and drying rooms 67 and 69. The paint tanks 66 and 68 contain the electrode inks B and A, respectively.

The base material film 62 fed from the roller 61 is first coated with the electrode ink B discharged from a slit-like nozzle of the paint tank 66, and then dried in the drying room 67. Subsequently, the base material film 62 is coated with the electrode ink A discharged from a slit-like nozzle of the paint tank 68, and then dried in the drying room 69. Consequently, on the surface of the base material film 62, a catalyst layer B made of the electrode ink B and a catalyst layer A made of the electrode ink A were formed.

In the coating, the gap between the nozzle of each paint tank and the base material, or the base material coated with the catalyst layer B, was set between 50 and 250 μm, and the feed rate was set at 1 m/minute. In the drying rooms 67 and 69, hot air with a temperature of 100° C. is fed to the coating section at a rate of 10 m$^3$/minute.

In the above-mentioned manner, the catalyst layers B and A were successively formed on the base material film. Similarly, the catalyst layer B was formed by only coating the electrode ink B, and the catalyst layer A was formed by coating only the electrode ink A.

Figure 12:
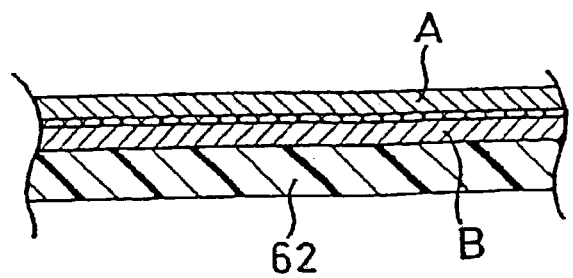
FIG. 12 is a cross sectional view showing the catalyst layer formed on the base sheet.

No cracks or the like were recognized on the surfaces of the catalyst layers of the film produced by the above-described processes. The condition of the cross section of the film having the catalyst layers B and A formed thereon was observed. As a result, as shown in FIG. 12, the total thickness of the catalyst layer A and the catalyst layer B was about 15 μm, the thickness of a single catalyst layer was about 8 μm, and the catalyst layer A and the catalyst layer B were basically composed of discontinuous, separated two layers though there is a portion where the catalysts were slightly mixed.

Next, a polymer electrolyte membrane (Nafion 112 manufactured by E.I. du Pont de Nemours and Company) was sandwiched between the film on which the catalyst layers B and A were formed successively and the film on which only the catalyst layer A was formed, and then the catalyst layers on the films were transferred to the electrolyte membrane by applying pressure with hot rollers so as to produce an electrolyte membrane/electrode assembly. The joining temperature was 100° C., and the joining pressure was $3 \times 10^7$ Pa. This electrolyte membrane/electrode assembly is denoted as I.

Moreover, two films, each having only the catalyst layer B formed thereon, were prepared, the polymer electrolyte membrane was sandwiched between these films, and the catalyst layers B were transferred to the electrolyte membrane by using the hot rollers in the same manner as above. Next, a film on which only the catalyst layer A was formed was placed on one side, and the catalyst layer A was formed on the catalyst layer B by using the hot rollers again so as to produce an electrolyte membrane/electrode assembly II. A cross section of this electrolyte membrane/electrode assembly II was observed. As a result, it was found that at the interface between the catalyst layer A and the catalyst layer B on one side of the electrolyte membrane, no mixture of the catalysts occurred, and these two layers were discontinuous. No residual solids of the catalyst layers were recognized on the base material films from which the catalyst layers were transferred, and thus the transfers were carried out satisfactorily.

For a comparison purpose, an electrolyte membrane/electrode assembly was produced by coating the electrode ink B and the electrode ink A on the diffusion layers of the electrode base materials by a screen printing technique.

Carbon paper of a predetermined size was set in a printer, and the electrode ink B was coated. A stainless steel 200-mesh screen was used as the screen. The carbon paper coated with the electrode ink B was dried in a drier set at 80° C. Consequently, the catalyst layer B was formed on the carbon paper. This carbon paper was set in the screen printer again, and the electrode ink A was coated on the catalyst layer B in the same manner and then dried to form the catalyst layer A. Separately from this carbon paper, only the catalyst layer A was formed on carbon paper by using a device similar to the above printer.

It was found as a result of observing a cross section of the carbon paper on which the catalyst layers B and A were formed that a mixed layer in which the catalyst layers A and B were mixed together was formed at the interface between the catalyst layers A and B. An electrolyte membrane/electrode assembly III was produced by sandwiching the polymer electrolyte membrane between the carbon paper on which the catalyst layers B and A were formed and the carbon paper on which only the catalyst layer A was formed, and joining them by hot pressing.

Each of the electrolyte membrane/electrode assemblies I and II was punched out to a predetermined size, sandwiched between carbon papers and gaskets arranged on the periphery of the carbon papers, and then set in a unit cell test device. The electrolyte membrane/electrode assembly III was set in the unit cell test device by arranging gaskets on the periphery of the carbon papers. Then, by using the electrode having the catalyst layers B and A as the anode, the cell characteristics were examined. A reformed simulation gas (25% carbon dioxide, 50 ppm carbon monoxide, hydrogen balance gas) humidified and heated to a dew point of 75° C. was supplied to the anode, while the air humidified and heated to a dew point of 60° C. was supplied to the cathode. The current-voltage characteristics were examined under the conditions that the cell temperature was 80° C., the fuel utilization ratio was 80%, and the air utilization ratio was 40%. The results are shown in FIG. 13.

Figure 13:
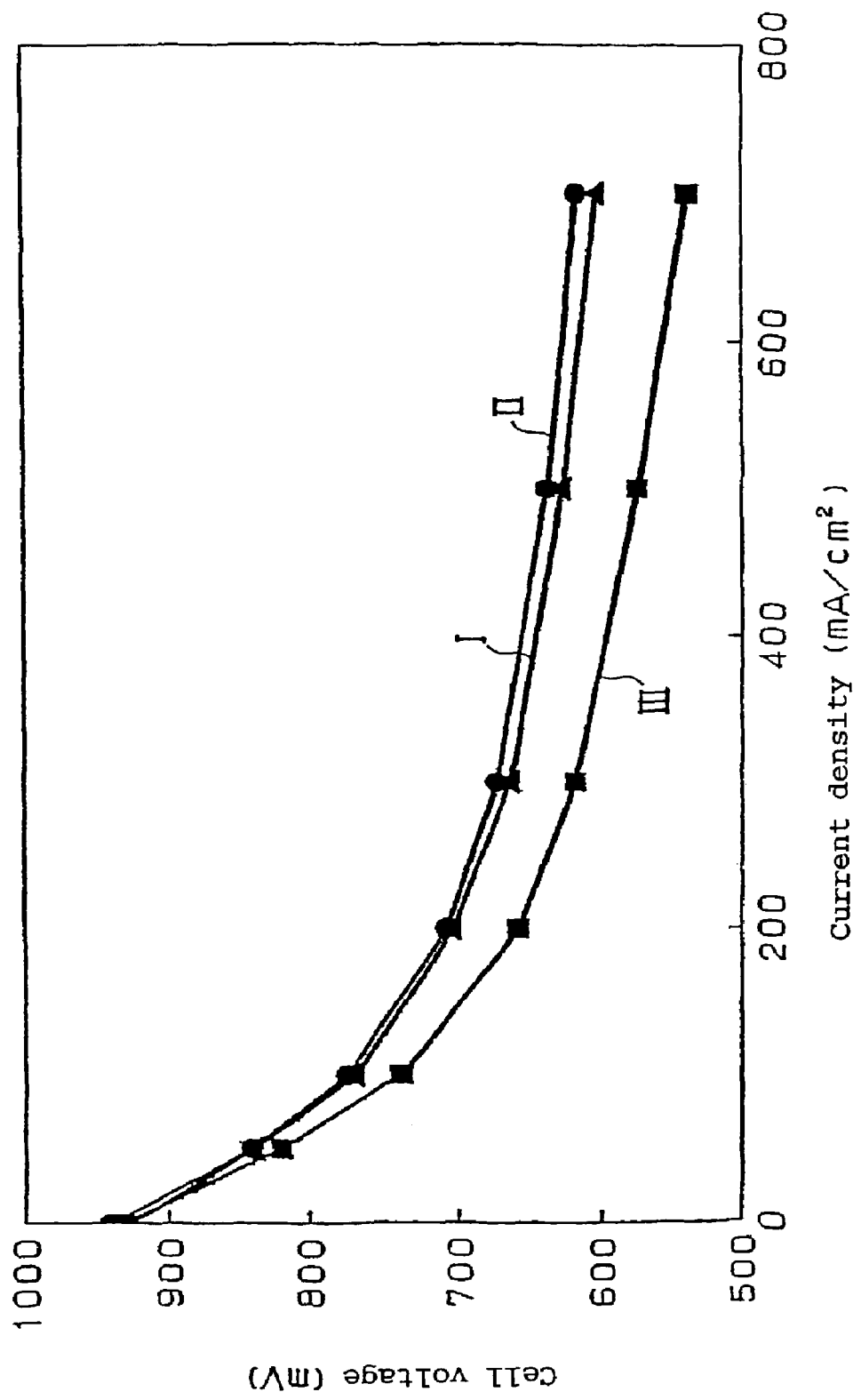
FIG. 13 is a graph showing the relationship between current-voltage and current density of fuel cell of another example of the present invention.

According to FIG. 13, the cell using the electrolyte membrane/electrode assembly II had the most superior characteristics, while the cell using the electrolyte membrane/electrode assembly III had the lowest performance. Essentially, on the anode side of the assembly III, carbon monoxide should be efficiently oxidized and removed by the catalyst layer B which is not in contact with the membrane, but the effect was reduced and the reason for this would be mixture of the catalysts at the interface between the catalyst layer B and the catalyst layer A. On the other hand, it was considered that, in the assembly II, since the catalysts were not mixed together in the interface between the catalyst layer B and the catalyst layer A on the anode side, the carbon monoxide was efficiently removed and the influence on the catalyst layer A was decreased as small as possible. Besides, although the characteristic of the cell using the assembly I was slightly inferior to the cell using the assembly III, the degree of mixture of the catalyst layers was very small compared to that of the assembly III, and therefore the cell using the assembly I had superior characteristic to the cell using the assembly III. Although not shown in here, cells produced using a carbon powder carrying a combination of platinum/palladium, platinum/rhodium, platinum/nickel, platinum/iridium, or platinum/iron, instead of the carbon powder carrying platinum/ruthenium of the electrode ink B, also exhibited characteristics similar to the cell using carbon carrying platinum/ruthenium.

According to the method illustrated here, it is possible to realize catalyst layers with multi-layer structure for an electrolyte membrane/electrode assembly. Moreover, it is possible to produce a polymer electrolyte fuel cell having higher characteristic than that obtained by a conventional method for forming a multi-layer structure.

EXAMPLE 8

First, a carbon powder was caused to carry platinum in a weight ratio of 75:25. A dispersion containing 5 wt % of hydrogen ion conductive polymer electrolyte (Nafion solution manufactured by Aldrich Chemical Co., Inc.) and 2-propanol and butyl acetate as solvents were added to the carbon powder, and mixed by a ball-mill technique so as to prepare an electrode ink C. The viscosity of this ink was lower than the electrode inks A and B used in Example 7, and was 10 (mPa·s) at a shear rate of 100 (1/sec).

A catalyst layer was formed by coating the ink on a porous sheet by using the coater used in Example 7. As the porous sheet, fabric of 50 denier polyester fiber, the same fabric subjected to water repellent treatment, and a usual polyester film used in Example 7 were used. The thickness of the fabric was about 0.1 mm. A catalyst layer was formed on the polyester fabric not subjected to water repellent treatment, by charging the electrode ink C in the paint tank 66 and setting the feed rate of base material at 5 m/minute, and then dried in the drying room at 100° C. The drying time was 1.5 times as much as Example 7. Immediately after the coating, the solvent component in the electrode ink promptly penetrated onto the polyester fabric. At this time, it was recognized that the catalyst component slightly penetrated into the back side of the fabric. No cracks or the like were recognized on the dried coating.

When the polyester fabric subjected to water repellent treatment was used, the penetration of the catalyst component was less compared to the fabric not subjected to water repellent treatment, and the surface shape of the coating was improved. Both of these catalyst layers had a film thickness of about 10 µm. On the other hand, when the electrode ink was coated on the polyester film in the same manner, the solvent component in the electrode ink remained on the film, and therefore the coating was unstable and hard to be fixed and uneven coating was seen on the dried catalyst layer. The reason for this is considered that the coating after the coating process could not maintain the shape because of a low viscosity of the paint, and unevenness in the coating was caused during the drying.

Two sets of each of the base material sheets having the catalyst layers formed in such a manner were prepared and the catalyst layers were joined to both sides of the polymer electrolyte membrane (Nafion 112) by transfer using the hot rollers in the same manner as in Example 7 so as to produce an electrolyte/electrode assembly. The electrolyte membrane/electrode assemblies obtained using a polyester fiber fabric, the same fabric subjected to water repellent treatment, and the polyester film of Example 7 as the base material sheets are denoted as IV, V, and VI, respectively. The conditions such as the joining condition are the same as in Example 7. After the transfer of the catalyst layer, a small amount of residual solid of the catalyst ink was recognized on the polyester film not subjected to water repellent treatment, while almost no residual solid of the catalyst ink was recognized on the fabric subjected to water repellent treatment, and it was understood that the transfer was performed more satisfactorily. In addition, when the polyester film was used, although the transfer of the catalyst layer was satisfactorily performed, unevenness caused during the formation of the coating was also transferred as it is to the electrolyte membrane side.

As the porous sheet of the base material, a composite sheet, which was obtained by laminating a porous polytetrafluoroethylene sheet with an air permeability of 35 sec and a polyester fabric with an air permeability of 5 sec or less, was used, and coating with the electrode ink was performed in the same manner as above. The air permeability was indicated by average seconds taken for 100 ml of air to pass through a sample with a surface of 645.16 mm$^2$, according to the JIS standards air permeability test (JISP8117). In other words, as the value increases, the air permeability decreases and the material is rather dense. The electrode ink, the coater, and the coating conditions were the same as in the cases using the polyester fabrics. The surface to be coated was the polyester fabric side. Immediately after the coating, the solvent component in the electrode ink promptly penetrated into the polyester fabric on the front side, but penetration of the catalyst component into the back surface, which was seen in the previous cases of using the polyester fabrics, was not observed. It is presumed that the catalyst component was stopped as the air permeability of the porous polytetrafluoroethylene sheet on the back side was low and the material was dense. No cracks or the like were recognized on the dried coating.

The catalyst layer thus formed on the sheet was transferred and joined to the polymer electrolyte membrane by using the hot rollers in the same manner as above so as to produce an electrolyte membrane/electrode assembly VII. No residual solid of the catalyst ink was recognized on the polyester fabric made of the composite sheet after the transfer of the catalyst layer.

Figure 14:
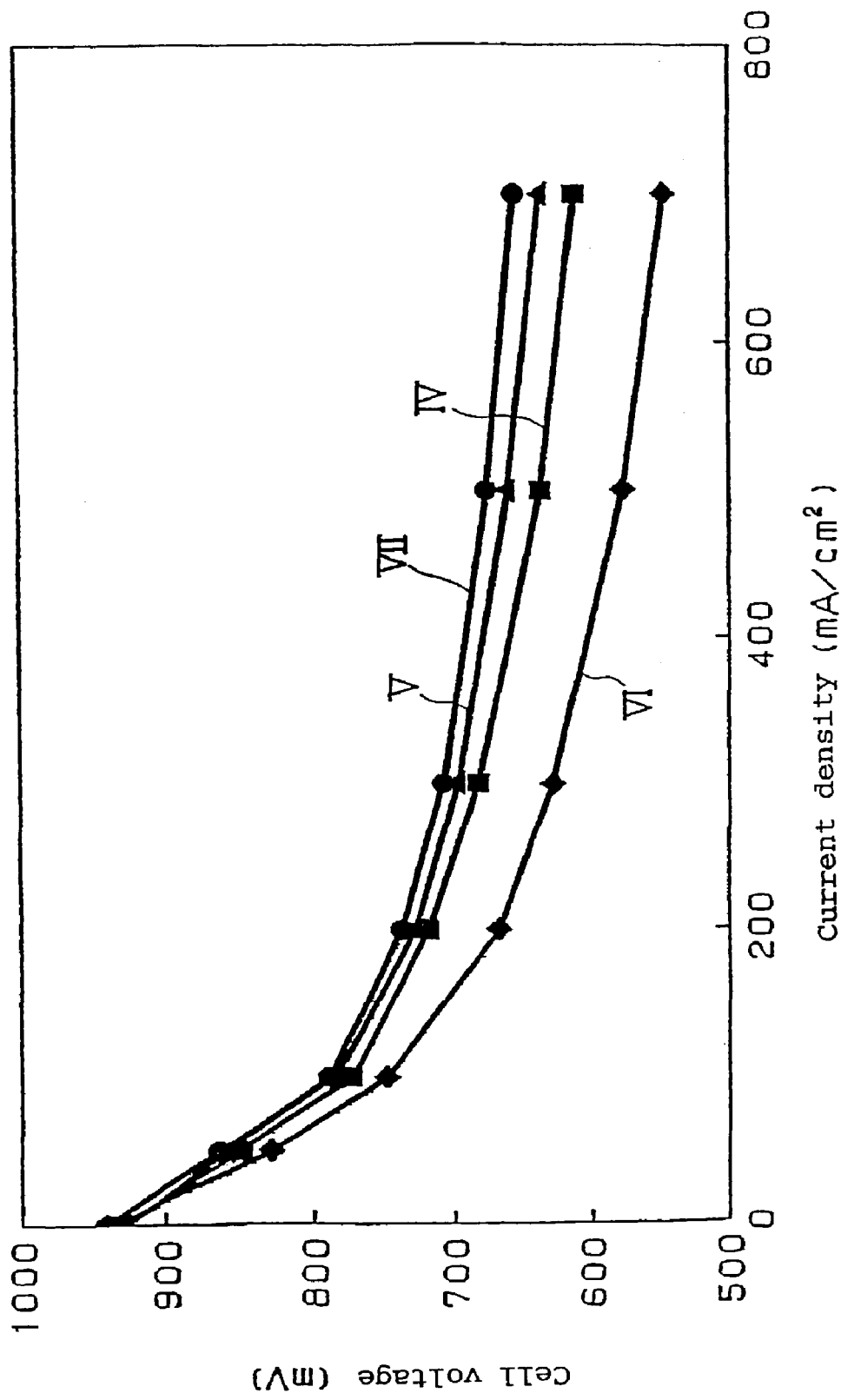
FIG. 14 is a graph showing the relationship between current-voltage and current density of fuel cell of still another example of the present invention.

Each of the electrolyte membrane/electrode assemblies IV, V, VI and VII was punched out to a predetermined size, sandwiched between carbon papers and gaskets arranged on the periphery of the carbon paper, and then set in a unit cell test device to examine the cell characteristics. The current-voltage characteristics were examined under the same conditions as in Example 7, except that a hydrogen gas humidified and heated to a dew point of 75° C. was supplied to the anode. The results are shown in FIG. 14. It was found that the cell using the electrolyte membrane/electrode assembly VII had the most superior cell characteristic. Further, it was found that cell characteristics were improved as the transfer performance increased.

As described above, according to the method of forming an electrode catalyst layer on a porous sheet base material having a suitable gas permeability, since the porous sheet is promptly impregnated with the solvent component in the catalyst ink after coating, it is possible to form semi-dried immovable coating. Accordingly, it is not necessary to use a viscosity adjusting agent such as terpineol which is conventionally used to adjust the viscosity. Consequently, it is possible to avoid a lowering of the cell performance. In addition, the catalyst layers can be formed using inks with a low viscosity, and the solvent can be selected from a wider range. Further, by using a laminated product of porous sheets with different air permeability, it is possible to prevent the catalyst from entering into the base material.

INDUSTRIAL APPLICABILITY

As clear from the above, according to the present invention, it is possible to sufficiently and evenly bring the polymer electrolyte and the catalyst into contact with each other and increase the reaction area inside the electrodes, thereby realizing a polymer electrolyte fuel cell exhibiting high discharge performance.

The invention claimed is:

1. A polymer electrolyte fuel cell comprising:
a hydrogen ion conductive polymer electrolyte membrane;
a pair of electrodes which have catalyst layers sandwiching said hydrogen ion conductive polymer electrolyte membrane therebetween and gas diffusion layers in contact with said catalyst layers;
a conductive separator plate having a gas flow channel for supplying a fuel gas to one of said electrodes; and
a conductive separator plate having a gas flow channel for supplying an oxidant gas to the other electrode, characterized in that said catalyst layers comprise a hydrogen ion conductive polymer electrolyte and conductive carbon particles carrying a catalyst metal, and the hydrogen ion conductive polymer electrolyte is provided in pores of an agglomerate structure of the conductive carbon particles,
wherein the diameter of the hydrogen ion conductive polymer electrolyte is not smaller than 5 nm and not greater than 40 nm, and
wherein the polymer electrolyte is in the form of particles.

2. The polymer electrolyte fuel cell as set forth in claim 1, wherein the pores of the agglomerate structure of the conductive carbon particles are not smaller than 5 nm and not greater than 100 nm.

3. The polymer electrolyte fuel cell as set forth in claim 1, wherein the hydrogen ion conductive polymer electrolyte is provided in pores of primary particles of the conductive carbon particles.

4. The polymer electrolyte fuel cell as set forth in claim 3, wherein the pores of the primary particles of the conductive carbon particles are not smaller than 1 nm and not greater than 10 nm.

5. The polymer electrolyte fuel cell as set forth in claim 1, wherein the hydrogen ion conductive polymer electrolyte is not less than 10,000 and not more than 500,000 in molecular weight.

6. The polymer electrolyte fuel cell as set forth in claim 1, wherein the hydrogen ion conductive polymer electrolyte has a main chain polymerization degree of not less than 10 and not more than 500.

7. The polymer electrolyte fuel cell as set forth in claim 1, wherein the catalyst particles are present as particles of not smaller than 0.5 nm and not greater than 5 nm on surfaces of the carbon particles, near a hydrogen ion conducting channel present inside a layer of the hydrogen ion conductive polymer electrolyte.

8. The polymer electrolyte fuel cell as set forth in claim 1, wherein said catalyst layer is composed of a plurality of layers which are discontinuous in a thickness direction.

9. The polymer electrolyte fuel cell as set forth in claim 8, wherein said catalyst layer comprises a first catalyst layer in contact with said hydrogen ion conductive polymer electrolyte membrane and a second catalyst layer formed on said first catalyst layer, a catalyst component of said first catalyst layer is platinum, and catalyst components of said second catalyst layer are platinum and at least one metal selected from the group consisting of ruthenium, palladium, rhodium, nickel, iridium and iron.

10. A polymer electrolyte fuel cell comprising:
a hydrogen ion conductive polymer electrolyte membrane;
a pair of electrodes which comprise catalyst layers sandwiching said hydrogen ion conductive polymer electrolyte membrane therebetween and gas diffusion layers in contact with said catalyst layers;
a conductive separator plate having a gas flow channel for supplying a fuel gas to one of said electrodes; and
a conductive separator plate having a gas flow channel for supplying an oxidant gas to the other electrode, characterized in that said catalyst layers comprise a hydrogen ion conductive polymer electrolyte and carbon particles carrying a catalyst metal, and the hydrogen ion conductive polymer electrolyte is provided in pores of primary particles of the carbon particles,
wherein the pores of the primary particles of the conductive carbon particles are not smaller than 1 nm and not greater than 10 nm, and
wherein the polymer electrolyte is in the form of particles.

* * * * *